US007057645B1

(12) United States Patent
Hara et al.

(10) Patent No.: US 7,057,645 B1
(45) Date of Patent: Jun. 6, 2006

(54) CAMERA SYSTEM THAT COMPENSATES LOW LUMINANCE BY COMPOSING MULTIPLE OBJECT IMAGES

(75) Inventors: Yoshihiro Hara, Kishiwada (JP); Akira Kosaka, Yao (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/494,940

(22) Filed: Feb. 1, 2000

(30) Foreign Application Priority Data

Feb. 2, 1999 (JP) ................................. 11-024842

(51) Int. Cl.
H04N 5/228 (2006.01)
H04N 5/225 (2006.01)
G03B 17/00 (2006.01)
G06K 9/32 (2006.01)

(52) U.S. Cl. .............................. 348/208.6; 348/216.1; 348/208.2; 396/55; 382/294

(58) Field of Classification Search ........... 348/208.12, 348/208.99, 208.4, 208.5, 208.7, 208.8, 208.11, 348/208.13, 216.1, 217.1, 362, 367, 208.6; 396/52, 53, 54, 55; 382/294, 295, 296, 298
See application file for complete search history.

(56) References Cited

U.S. PATENT DOCUMENTS

| | | | | |
|---|---|---|---|---|
| 4,614,966 A | * | 9/1986 | Yunoki et al. ............... 348/282 |
| 4,864,409 A | * | 9/1989 | Platte et al. ............. 348/208.6 |
| 5,335,016 A | * | 8/1994 | Nakagawa ............. 375/240.03 |
| 5,502,484 A | * | 3/1996 | Okada ..................... 348/208.6 |
| 5,517,246 A | * | 5/1996 | Suzuki ..................... 348/412.1 |
| 5,689,611 A | * | 11/1997 | Ohta et al. ..................... 386/46 |
| 5,825,415 A | * | 10/1998 | Kaneda et al. ........... 348/208.6 |
| 5,894,325 A | * | 4/1999 | Yonemoto ................... 348/302 |
| 5,929,908 A | * | 7/1999 | Takahashi et al. .......... 348/364 |
| 6,122,004 A | * | 9/2000 | Hwang ................... 348/208.13 |
| 6,172,707 B1 | * | 1/2001 | Ouchi et al. ............. 348/208.6 |
| 6,389,179 B1 | * | 5/2002 | Katayama et al. .......... 382/284 |
| 6,952,234 B1 | * | 10/2005 | Hatano ................... 348/208.99 |
| 2003/0076408 A1 | * | 4/2003 | Dutta .......................... 348/61 |
| 2003/0133021 A1 | * | 7/2003 | Hamamura .............. 348/229.1 |

(Continued)

FOREIGN PATENT DOCUMENTS

JP 61-157080 7/1986

(Continued)

OTHER PUBLICATIONS

Wixson et al.; "Image Alignment for Precise Camera Fixation and Aim"; Jun. 1998; IEEE Computer Society Conference on Computer Vision and Pattern Recognition; pp. 594-600.*

(Continued)

Primary Examiner—Ngoc-Yen Vu
Assistant Examiner—John M. Villecco
(74) Attorney, Agent, or Firm—Buchanan Ingersoll PC

(57) ABSTRACT

In a digital camera using an image pickup device such as CCD, a high resolution and properly exposed image is obtained by composition a plurality of image data of the same object taken by a plurality of image pickup operation when a luminance of the object is lower. Each image data is taken under a condition that an integration time (a charge storage time) of the image pickup device is shorter than a limit integration time causing a camera shake. A position of a frame on the image pickup device from which electric charges of the pixels are read out as the image data is corrected so as to cancel the movement of the camera between the image pickup operations.

8 Claims, 21 Drawing Sheets

U.S. PATENT DOCUMENTS

2006/0002693 A1* 1/2006 Ogawa .................. 396/54
2006/0017817 A1* 1/2006 Okubo ................ 348/208.99

FOREIGN PATENT DOCUMENTS

| JP | 04-314274 | 11/1992 |
|----|-----------|---------|
| JP | 4-314274 | 11/1992 |
| JP | 06141228 | 5/1994 |
| JP | 09200606 A * | 7/1997 |
| JP | 09-261526 | 10/1997 |
| JP | 09261526 A * | 10/1997 |

OTHER PUBLICATIONS

Machine-Assisted Translation of Japanese Publ. No. 09-261526 A, published Oct. 3, 1997, Thomson-Derwent.*

* cited by examiner

CAMERA SYSTEM THAT COMPENSATES LOW LUMINANCE BY COMPOSING MULTIPLE OBJECT IMAGES

This application is based on patent application Hei.11-024842 filed in Japan, the contents of which are hereby incorporated by references.

BACKGROUND OF THE INVENTION

1. Field of the Invention

This invention relates to a camera system for forming a single picture image by a composition of a plurality of image data of the same object which are taken by an image pickup device such as CCD (Charge Coupled Device).

2. Description of the Related Art

In a conventional digital camera for taking a still picture image by using an image pickup device, when a luminance of an image is lower and a flash light is not used, a charge storage time for storing electric charge in each pixel of the image pickup device (hereinafter, abbreviated as integration time) is lengthened for adjusting a brightness of an image displayed on a monitor display. Alternatively, an amplification factor for amplifying output signals from the image pickup device is increased for adjusting the brightness of the image displayed on the monitor display.

When the integration time is lengthened longer than a certain integration time (hereinafter abbreviated as limit integration time), the image focused on the image pickup device will be moved while a charge storage operation of the image pickup device due to the shaking of the operator's hand (hereinafter, abbreviated as camera shake). Thus, the image displayed on the monitor display will be blurred due to the camera shake.

On the other hand, when the amplification factor of the output signals from the image pickup device is increased, the image displayed on the monitor display includes a lot of noise component, and a quality of the image is lower. Since a quantity of the electric charge stored in each pixel of the image pickup device is originally a few, the output signal having relatively lower S/N is amplified by a larger amplification factor.

SUMMARY OF THE INVENTION

A purpose of this invention is to provide a camera system by which a high quality and properly exposed picture image can be obtained without using a flash light when an illuminance of an image is lower.

A camera system in accordance with one aspect of this invention takes a plurality of image data of an object by an image pickup device during an integration time shorter than a limit integration time, and forms a single picture image by composition of the image data when an illuminance of the object is lower than a predetermined value.

By such a configuration, each image data has no error component of image flow due to a camera shake, since the image data is taken by the image pickup device during the integration time shorter than the limit integration time causing the camera shake. The picture image formed by the composition of the image data has a low noise component, since it is not formed by an amplification of low S/N image data. As a result, a high quality picture image having a low noise component and no image flow can be obtained by the camera system.

DETAILED DESCRIPTION OF THE EMBODIMENT

First Embodiment

A first embodiment of this invention is described. A configuration of a digital camera in the first embodiment and an arrangement of elements constituting the digital camera are shown in FIG. 1.

Figure 1:
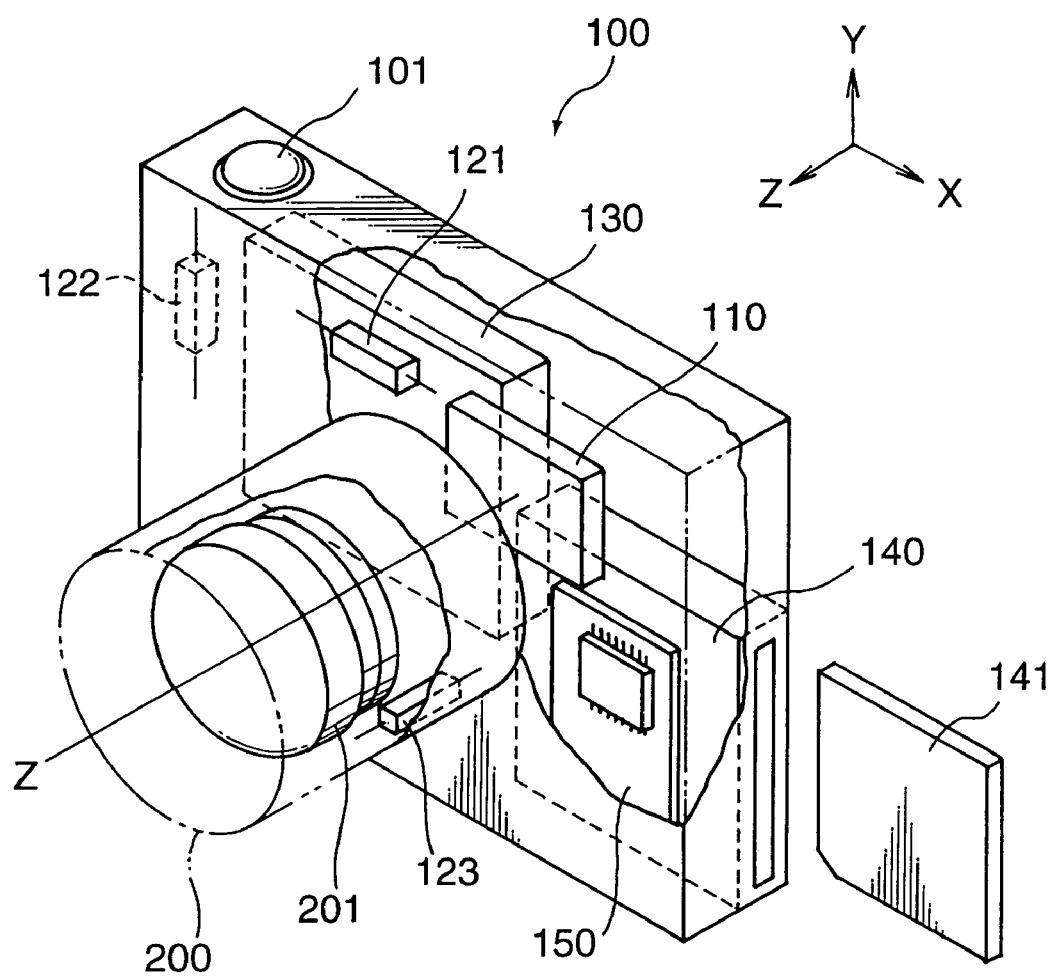
FIG. 1 is a perspective view showing a configuration of a digital camera in a first embodiment of this invention.

As can be seen from FIG. 1, a taking lens unit 200 is provided substantially at the center of a body of a digital camera 100. The taking lens 200 is not necessarily an interchangeable one. Furthermore, a focal length of an optical lens system 201 of the taking lens unit 200 is not necessarily variable. Focusing of the optical lens system 201 can be adjusted by manual or automatic.

Figure 3:
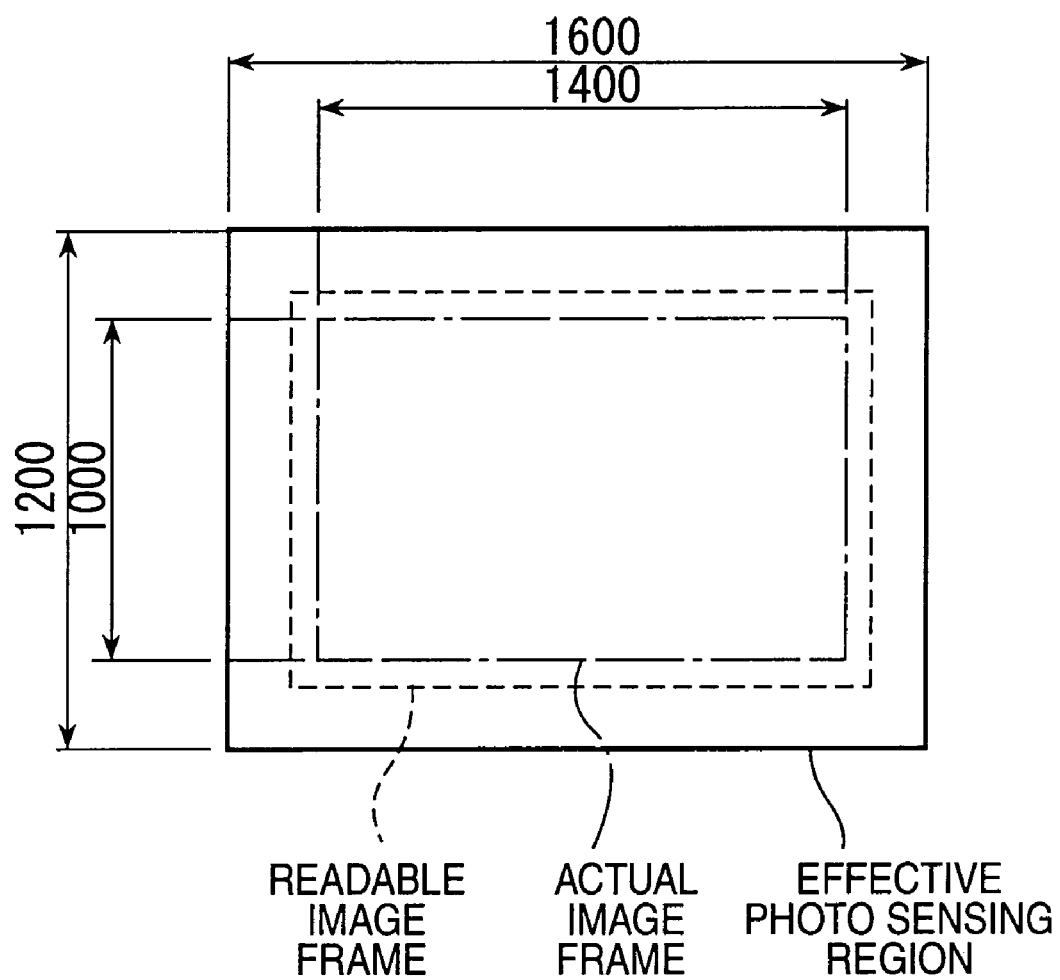
FIG. 3 is a front view of an image pickup device showing relations of an actual image frame, a readable image size and an effective photosensing region of the image pickup device in the first embodiment.

An image pickup device such as CCD 110 is disposed on an optical axis Z (which is called Z-axis, too) and in the vicinity of a focal plane of the optical lens system 201. The image pickup device 110 is substantially the same as one widely used in a video camera with shake correction function. As shown in FIG. 3, the image pickup device 110 has an effective photosensing region illustrated by solid line which is larger by a predetermined size in both of the vertical direction and the horizontal direction than an actual image frame (or a recordable image region) illustrated by one dotted chain line. Numerals in FIG. 3 show number of pixels of an example of the image pickup device 110. It is preferable to use a CCD having the pixels more than 1.5 million pixels. In the first embodiment, there is a possibility that the image data outputted from the image pickup device 110 is rotated around the Z-axis when the image data is corrected. Details of the rotation of the image data will be described below. Thus, the image pickup device 110 can output an image data (electric charges stored in the pixels) from an optional region having the same area as a region (readable image region) illustrated by dotted line larger than the actual image frame.

Exposure of the image pickup device 110 for taking the image data in the first embodiment is mainly controlled by changing the integration time of the image pickup device 110. When an illuminance of an image is higher than a predetermined value, it is possible to insert an ND (Neutral Density) filter in the optical lens system 201. Alternatively, a mechanical aperture diaphragm can be provided in the optical lens system 201.

A shutter start button 101 is provided in the vicinity of right side on an upper face of the body of the digital camera 100 observed from rear face by a user. A first switch S1 and a second switch S2 which are serially switched on are provided on the shutter start button 101. When a finger of the user is touched on the shutter start button 101 or when the shutter start button 101 pushed down to a midway, the first switch S1 is switched on. When the shutter start button 101 is fully pushed down, the second switch S2 is switched on.

The digital camera 100 includes X-, Y- and Z-angular velocity sensors 121, 122 and 123. The X-angular velocity sensor 121 senses a quantity of rotational shake around an X-axis of an orthogonal coordinates (see FIG. 1) corresponding to a horizontal axis. The Y-angular velocity sensor 122 senses a quantity of rotational shake around a Y-axis of the orthogonal coordinates corresponding to a vertical axis. The Z-angular velocity sensor 123 senses a quantity of rotational shake around the Z-axis of the orthogonal coordinates corresponding to the optical axis of the optical lens system 201. A gyroscope using a piezoelectric device can be used as the angular velocity sensors 121, 122 and 123.

In this description, a direction parallel to the X-axis is abbreviated as X-direction, a direction parallel to the Y-axis is abbreviated as Y-direction, and a direction parallel to the Z-axis is abbreviated as Z-direction. The X-angular velocity sensor 121, the Y-angular velocity sensor 122 and the Z-angular velocity sensor are respectively abbreviated as X-sensor, Y-sensor and Z-sensor in the figure.

The digital camera 100 further includes a monitor display 130 using an LCD (Liquid Crystal Display), a recorder such as a memory card, a floppy disc and so on 140 for recording the image data on a recording medium 141, and a control circuit 150 configured by a CPU, a memory, and so on. The monitor display 130 is mainly used as a view finder. Since a size of the monitor display 130 is restricted by the size of the body of the digital camera 100, a 2-inch sized LCD having about 80 thousand pixels is used.

Figure 2:
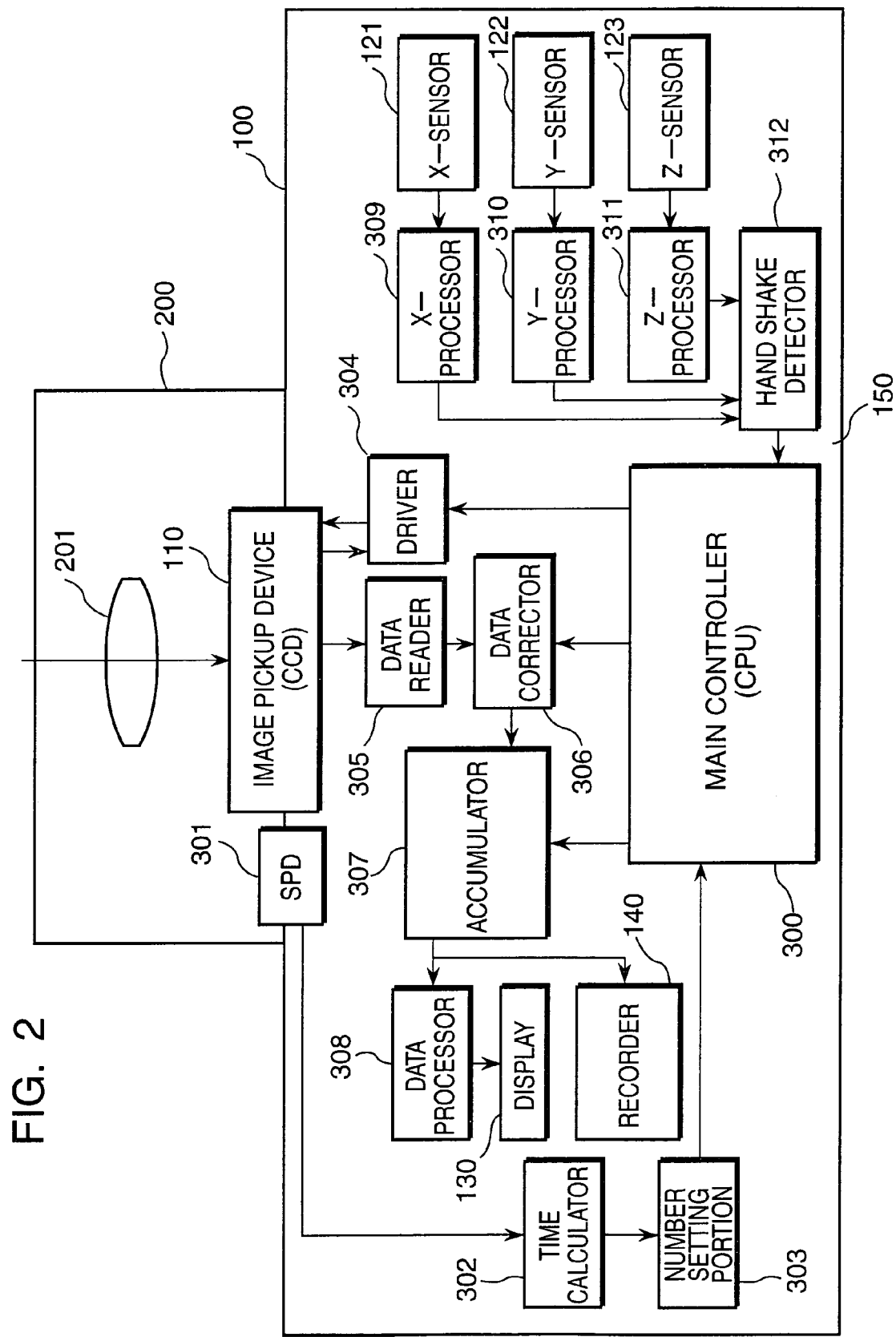
FIG. 2 is a block diagram showing a configuration of a control circuit in the first embodiment.

A block diagram of the control circuit 150 is shown in FIG. 2. The control circuit 150 has a photosensor 301 such as a SPD (Silicon Photo Diode) for sensing an illuminance of an object. The photosensor 301 measures a quantity of light of an image of the object passing through the optical lens system 201 of the taking lens unit 200 and focused on the image pickup device 110. The photosensor 301 is not necessarily a TTL (Through The Lens) type one. A non-TTL type sensor directly measuring the illuminance of the object can be used as the photosensor 301.

Output of the photosensor 301 is inputted to an integration time calculator 302. The integration time calculator 302 calculates a proper integration time T1 of the image pickup device 110 and the limit integration time T0. When the proper integration time T1 and the limit integration time T0 are calculated, these data are inputted to an image pickup number setting portion 303. The image pickup number setting portion 303 judges whether it is necessary to take a plurality of the image data of the same object or not. When the image pickup number setting portion 303 judges that it is necessary to take a plurality of the image data of the same object, it calculates the number of image pickup operations "C", and outputs the results of judgement and the calculation to a main controller 300. Details of the limit integration time T0 will be described below.

The main controller 300 controls a sequence of whole of the digital camera. When the main controller 300 receives the proper integration time T1, the limit integration time T0 and the number of image pickup operations "C", it controls an image pickup device driver 304. The image pickup device driver 304 outputs an integration start signal and an integration stop signal to the image pickup device 110. The integration time of the image pickup device 110 is controlled by the timings of outputting the integration start signal and the integration stop signal. When the integration of the image pickup device 110, that is, the storage of electric charges in the pixels of the image pickup device 110 is completed, an image data reader 305 inputs driving signals to the image pickup device 110 for transmitting the electric charges stored in the pixels. Thus, the image data can be read out from the image pickup device 110.

An image data corrector 306 corrects the image data taken on and after the second image pickup operation, when a number of image pickup operations "C" equal to or larger than two is set by the image pickup number setting portion 305. Details of the image data correction will be described below.

An image data accumulator 307 accumulates the image data taken on and after the second image pickup operation and corrected by the image data corrector 306 on a first image data taken on the first image pickup operation when the number of image pickup operations "C" equal to or larger than two is set by the image pickup number setting portion 303. In the first embodiment, when the image data is taken on and after the second image pickup operation, the image data is corrected and the corrected data is accumulated on the first image data, soon. When the image data accumulator 307 executes the accumulation of the image data taken by a predetermined number of image pickup operation, it outputs the accumulated data as a final image data to an image data processor 308 and the recorder 140.

The image data processor 308 converts the final image data from the image data accumulator 307 to NTSC signal or PAL signal for displaying a monitor image on the monitor display 130 and outputs the converted signal to the monitor display 130. The recorder 140 records the final image data into the recording medium 141.

An X-sensing processor 309 is connected to the X-angular velocity sensor 121. A Y-sensing processor 310 is connected to the Y-angular velocity sensor 122. A Z-sensing processor 311 is connected to the Z-angular velocity sensor 123. The X-, Y- and Z-sensing processors 309, 310 and 311 respectively have an integration function and a frequency filtering function. Analogous outputs from the sensing processors 309 to 311 are inputted to a camera shake sensor 312. The camera shake sensor 312 converts the analogous outputs to digital signals, compares the converted digital signals with predetermined values in time series, and outputs the digital signals to the main controller 300 as quantities of rotation shake around the X-, Y- and Z-axes. The main controller 300 controls the camera shake correction by the image data corrector 306 by using the quantities of rotation shake around the X-, Y- and Z-axes from the camera shake detector 312.

The limit integration time T0 is described. In a camera system using 135 size silver-halide film, a number 1/F which is an inverse number of a focal length "F" of an optical lens system is used as a limit shutter speed causing a camera shake corresponding to the limit integration time T0 (second). For example, when the focal length F=30 mm, the limit shutter speed causing a camera shake will be 1/30 sec. Similarly, a number 1/k·F which is an inverse number of a focal length "F" of the optical lens system 201 multiplied a correction coefficient "k" corresponding to the size of the image pickup device 110 is used as the limit integration time T0.

The limit shutter speed causing a camera shake or the limit integration time T0 is defined by resolving power of a human eye. When a quantity of an image flow of a picture image which is enlarged and printed on a photographic paper or displayed on a monitor display with a predetermined size is smaller than the resolution power of the human eye, the observer cannot recognize the image flow. In other words, the picture image has no image flow. When an enlargement ratio of the picture image is considered, a limit quantity of the image flow which can be recognized on a film or on the image pickup device 110 can be calculated. Furthermore, the image flow smaller than a pitch of pixels of the image pickup device 110 in the digital camera cannot be recognized. Thus, the value of the limit quantity of the image flow in the digital camera is different from that in the camera using the silver-halide film.

On the other hand, when the camera is held by hand, the camera shake cannot be avoidable due to a heartbeat with no relation to the integration time. The camera shake is caused by a relative movement of the optical lens system 201 of the taking lens unit 200 with respect to the object. Thus, the quantity of the image flow on the image pickup device 110 is in proportion to a magnification of the image against the object, that is the focal length "F" of the optical lens system 201.

When it is assumed that the focal length "F" of the optical lens system 201 (or the magnification of the image against the object) and the speed of the camera shake are constant, the quantity of the image flow is in proportion to the integration time "T" of the image pickup device 110. When the quantity of the image flow is designated by a symbol "D", it is shown by a formula $D \propto F \cdot T$. A limit quantity of the image flow is designated by a symbol "ΔD". The limit integration time T0 is shown by a formula $T0 \propto \Delta D/F$. A correction coefficient is designated by a symbol "k". The limit integration time T0 is shown by an equation $T0 = 1/k \cdot F$.

Relations between kinds of the camera shake and the quantity of the image flow are described with reference to FIGS. 4A to 4D and 5A to 5C. FIGS. 4A to 4D respectively relate to the camera shakes occurring in directions parallel to the X-, Y- and Z-axes.

Figure 4A:
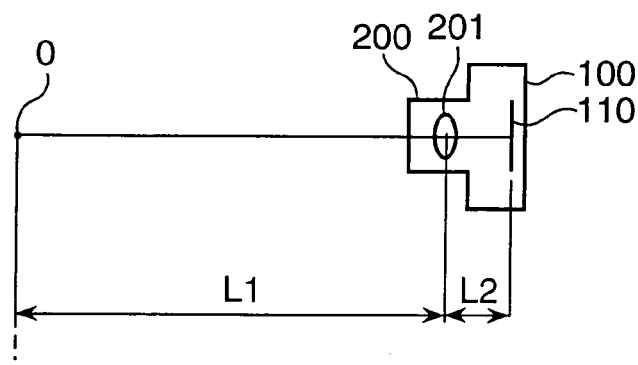
FIGS. 4A to 4D are drawings showing relations between kinds of camera shake and quantity of image flow.

FIG. 4A shows a case that no camera shake occurs. A symbol "L1" designates a distance from a principal point of the optical lens system 201 to an object "O". A symbol "L2" designates a distance from the principal point of the optical lens system 201 to the image pickup device 110.

Figure 4B:
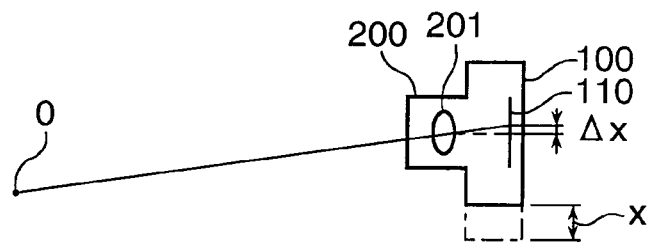

FIG. 4B shows a case that the camera 100 is moved by a distance "x" in the X-direction (horizontal direction). The quantity of the image flow "Δx" on the image pickup device 110 is shown by an equation $\Delta x = x \cdot L2/L1$. When $L1 \gg L2$, it is possible to disregard the quantity of the image flow "Δx".

Figure 4C:
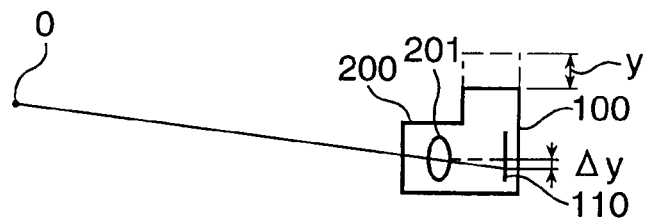

FIG. 4C shows a case that the camera 100 is moved by a distance "y" in the Y-direction (vertical direction). The quantity of the image flow "Δy" on the image pickup device 110 is shown by an equation $\Delta y = y \cdot L2/L1$. When $L1 \gg L2$, it is possible to disregard the quantity of the image flow "Δy", too.

Figure 4D:
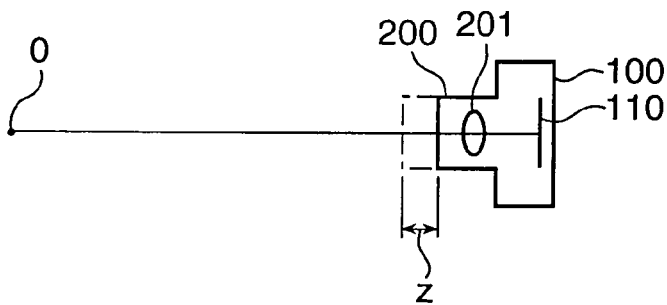

FIG. 4D shows a case that the camera 100 is moved by a distance "z" in the Z-direction (parallel to the optical axis of the optical lens system 201). In this case, the distance L1 to the object "O" varies to L1+Z, so that it causes a defocus of the image on the image pickup device 110. However, when $L1 \gg L2$, the image on the image pickup device is hardly blurred, and the magnification of the image against to the object is hardly varied.

As mentioned above, when the camera 100 is moved in the X-direction or the Y-direction, the quantity of the image flow owing to the movement of the camera 100 is in inverse proportion to the distance L1 to the object "O", so that the image flow with respect to the distant object can be disregarded. Furthermore, the movement of the camera 100 in the Z-direction may not cause the image flow.

Figure 5A:
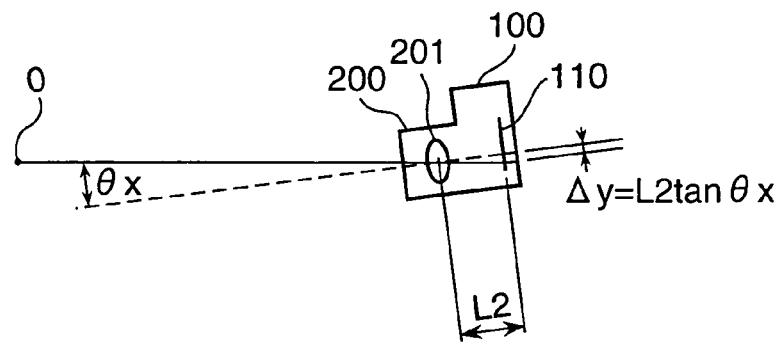
FIGS. 5A to 5C are drawings showing relations between kinds of camera shake and quantity of image flow.
Figure 5B:
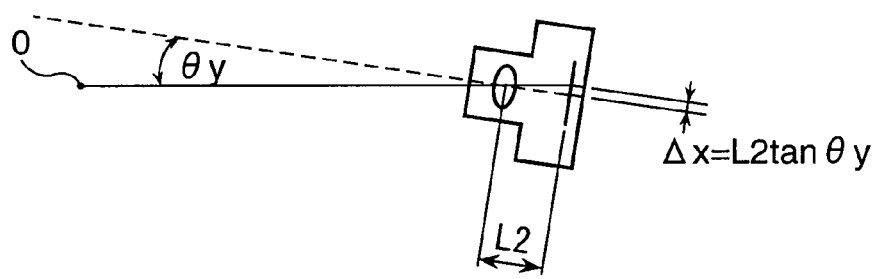
Figure 5C:
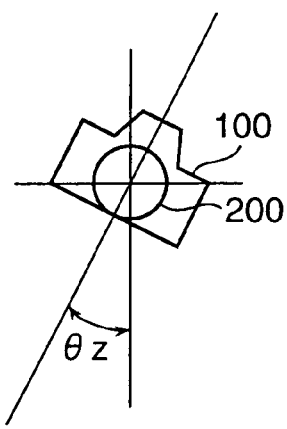

FIGS. 5A to 5C respectively relate to the rotation camera shakes occurring around the X-, Y- and Z-axes. FIG. 5A shows a case that the camera 100 is rotated by angle θx around the X-axis. The rotation of the camera around the X-axis causes the image flow in the Y-direction on the image pickup device 110. The quantity of the image flow Δy is shown by an equation $\Delta y = L2 \cdot \tan \theta x$.

FIG. 5B shows a case that the camera 100 is rotated by angle θy around the Y-axis. The rotation of the camera around the Y-axis causes the image flow in the X-direction on the image pickup device 110. The quantity of the image flow Δx is shown by an equation $$\Delta x = L2 \cdot \tan \theta y.$$

FIG. 5C shows a case that the camera 100 is rotated by angle θz around the Z-axis. In this case, the image on the image pickup device 110 directly rotates by θz.

As mentioned above, the rotation shakes around the X-, Y- and Z-axes directly causes the image flow with no relation to the distance to the object "O". The image flow with respect to the distant object is mainly caused by the rotation shake of the camera. In the first embodiment, the X-axis angular velocity sensor 121, the Y-axis angular velocity sensor 122 and the Z-axis angular velocity sensor 123 are provided for sensing quantities of the rotation shakes around the X-, Y- and Z-axes.

For preventing the image flow, it is preferable to select the integration time of the image pickup device 110 shorter than the limit integration time T0 (sec.). When a CCD is used as the image pickup device 110, the sensitivity of the CCD is substantially the same as that of a silver-halide film of ISO100. Thus, the sensitivity of the image pickup device 110 is regarded to be SV5. An open aperture f-number of the optical lens system 201 is AV4 (f4), the focal length "F" of the optical lens system 201 is 30 mm (F=30 mm), and the correction coefficient k=1. The limit integration time T0 becomes TV5 (1/30 sec.).

When an illuminance of the object is assumed to be BV5, a proper exposure value EVp becomes EV10, since EV=BV+SV. Furthermore, EV=AV+TV, so that a proper integration time T1 becomes TV6 (1/60 sec.). In this case, no camera shake or no image flow occurs. In other words, no camera shake occurs until the luminance of the object becomes lower than BV4.

When the luminance of the object is equal to or lower than BV4 (for example BV3), the proper integration time T1 becomes TV4 (1/15 sec.), so that the camera shake can easily occur when the camera is held by hand. In the first embodiment, a first and a second image pickup operations for preventing the occurrence of the camera shake are provided in the digital camera 100.

The first image pickup operation relates to the prevention of the camera shake when a monitor image is displayed on the monitor display 130 but the image data taken by the image pickup device 110 is not recorded.

As shown in FIG. 3, 1.4 million (1400×1000) pixels are included in the actual image frame of the image pickup device 110. The monitor display 130, however, has only 80 thousands pixels. Thus, one pixel data among 16 pixel data of 16 pixels, which are arranged by four in both of the vertical and horizontal directions on the image pickup device 110, is necessary only for displaying the monitor image on the monitor display 130. In the first image pickup operation, three control modes for the image pickup device are prepared. First is a direct output mode directly outputting the pixel data from every pixels of the image pickup device 110 without any adding operation. Second is a two pixel data adding mode adding two pixel data from two pixels adjoining, for example, in horizontal direction and outputting the added data as one pixel data. Third is a four pixel data adding mode adding four pixel data from four pixels adjoining in both of vertical and horizontal directions and outputting the added data as one pixel data.

In the direct output mode, quantity of electric charge in each pixel of the image pickup device 110 is directly outputted as the pixel data. In the two pixel data adding mode, quantities of electric charges in two pixels adjoining, for example, in the horizontal direction are added and outputted as the pixel data. The number of pixel data becomes a half, but the sensitivity of each pixel is equivalent to be double as high. Thus, the proper integration time T1 becomes a half. In the four pixel data adding mode, quantities of electric charges in four pixels adjoining in both of vertical and horizontal directions are added and outputted as the pixel data. The number of pixel data becomes a quarter, but the sensitivity of each pixel is equivalent to be quadruple as high. When the four pixel data adding mode is selected, it is equivalent to use an image pickup device having a quarter number of pixels and having a quadruple sensitivity as higher. Thus, the proper integration time T1 becomes a quarter.

When the proper integration time T1 is equal to or shorter than the limit integration time T0, there is no image flow (or camera shake) in the image taken by the proper integration time T1, so that the direct output mode is selected. On the other hand, when the proper integration time T1 is longer than the limit integration time T0, the two pixel data adding mode or the four pixel data adding mode is selected corresponding to a ratio of the proper integration time T1 against the limit integration time T0. In the above-mentioned example, when the two pixel data adding mode is selected, there is no camera shake in the monitor image of the object having the luminance BV3. When the four pixel data adding mode is selected, there is no camera shake in the monitor image of the object having the luminance BV2.

In the first embodiment, the pixel data adding mode is prepared up to the four pixel data adding mode. It is possible to prepare an eight pixel data adding mode, a sixteen pixel data adding mode, and so on. Alternatively, it is possible to form one image data by composition of a plurality of image data which are obtained by the four pixel data adding mode when the luminance of the object is too low to be responded by the four pixel data adding mode.

The second image pickup operation relates to the prevention of the camera shake when an image data is recorded into the recording medium and outputted to a printer via a personal computer. That is, the second image pickup operation aims to obtain a picture image having a high quality and no camera shake. A single final image data is obtained by composition of a plurality of image data which are taken by the image pickup device 110 in an integration time equal to or shorter than the limit integration time T0 under the direct output mode in the first image pickup operation. The position of the camera is moved in a time period between the first image pickup operation and another image pickup operation on and after the second. Thus, the image data taken in the image pickup operation on and after the second are corrected and the corrected image data are accumulated on the first image data.

In the second image pickup operation, each image data is taken in the integration time equal to or shorter than the limit integration time T0, so that there is no image flow (or camera shake) in the image even though it is in underexposure condition. With respect to the correction of the image data, a position of the image taken on and after the second image pickup operation is corrected by referring to the first image taken by the first image pickup operation. Strictly speaking, the correction of the image data in the first embodiment means the correction of the position of the pixels on the image pickup device 110 from which the pixel data are read out. It is clearly different from the conception of the correction of the camera shake in the video camera with camera shake correction function in which each image data is taken in an integration time longer than the limit integration time T0 and includes error component due to the camera shake.

Basic Motion Sequence (Main Routine)

Figure 6:
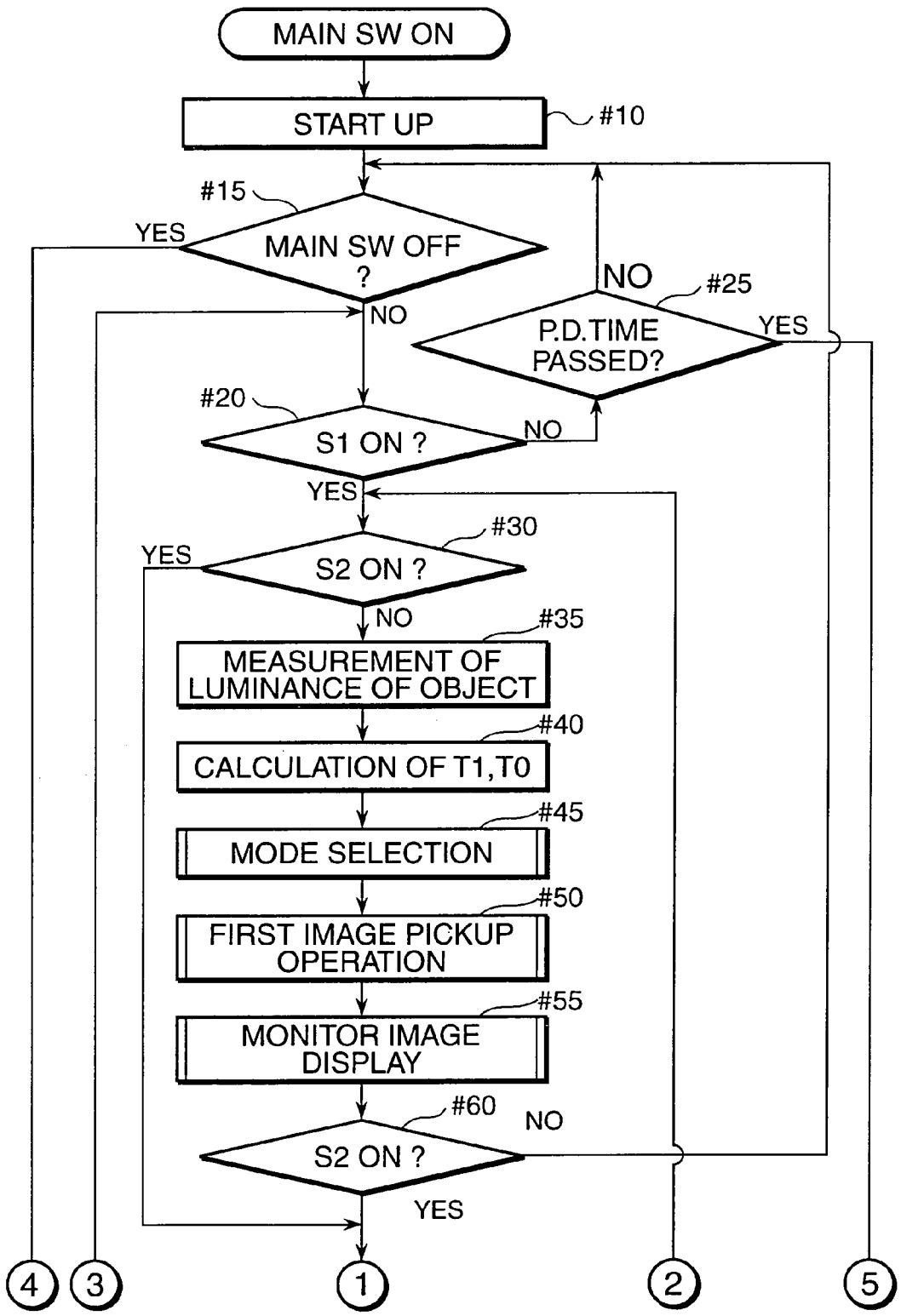
FIG. 6 is a flow chart showing a basic motion sequence of the digital camera in the first embodiment.
Figure 7:
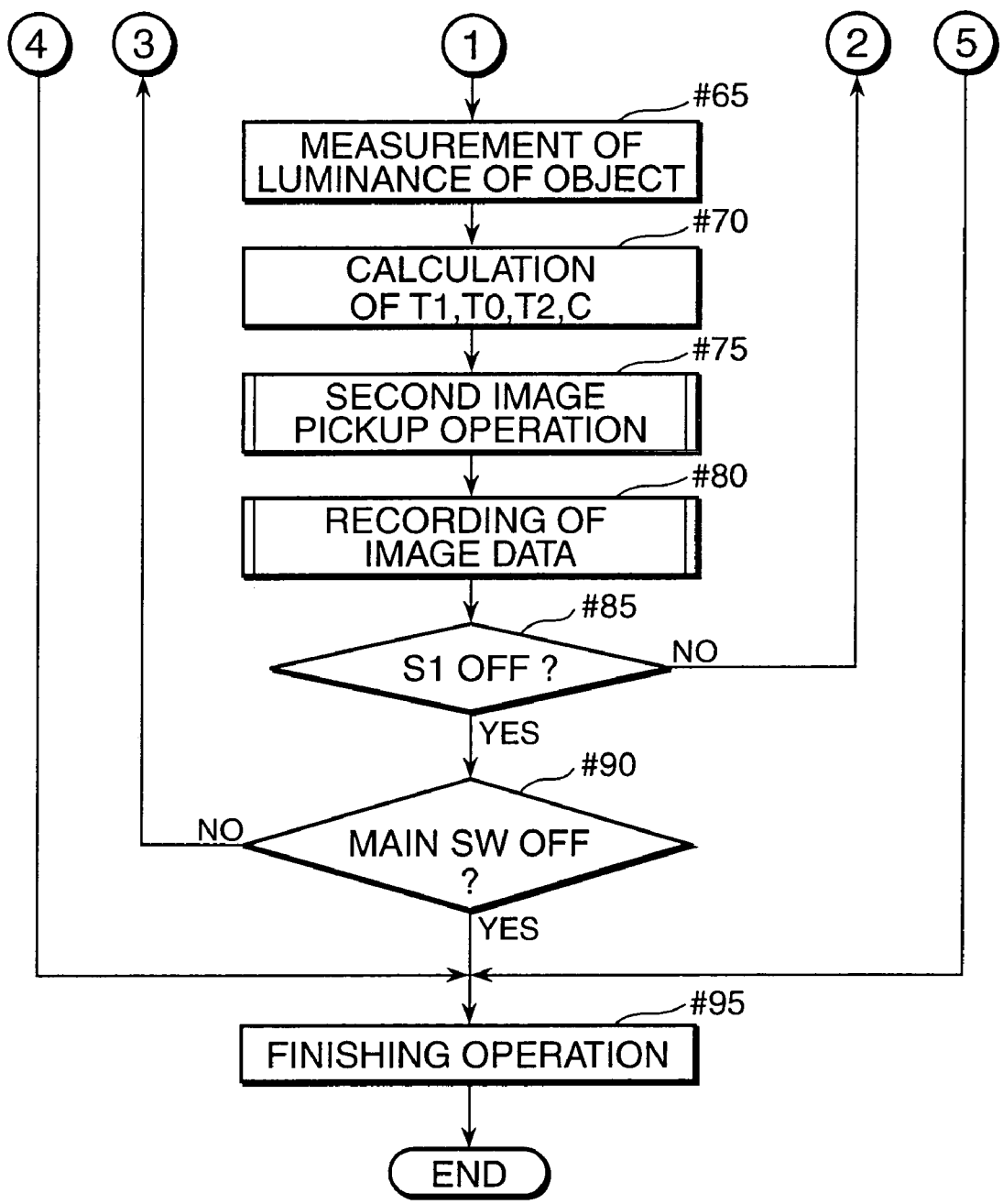
FIG. 7 is a flowchart showing a continuance of the flowchart shown in FIG. 6.

A basic motion sequence of the digital camera in the first embodiment is described with reference to flowcharts shown in FIGS. 6 and 7. In the flowchart, switches are abbreviated as "SW".

When a main switch (not shown in the figure) of the digital camera 100 is switched on, the main controller 300 executes a start up operation by which the image pickup device 110 is initialized and the taking lens unit 200 is set to be used for taking the image (Step #10). Subsequently, the main controller 300 judges whether the main switch is turned off or not (Step #15). When the main switch has been switched on (NO in Step #15), the main controller 300 further judges whether the first switch S1 on the shutter start button 101 is switched on or not (Step #20). When the first switch S1 is switched off (No in Step #20), the main controller 300 judges whether a predetermine time has passed from the switching on of the main switch or not (Step #25). When the first switch S1 has not been switched on during the predetermine time (YES in Step #25), the main controller 300 jumps to a finishing operation in step #95 for preventing the waste of the battery. When the main switch is switched off in the step #15, the main controller 300 jumps to the step #95.

When the predetermined time has not passed in the step #25, the main controller 300 waits the first switch S1 being switched on with confirming the main switch been switched on. As mentioned above, the first switch S1 is switched on when a finger of the user is touched on the shutter start button 101 or when the shutter start button 101 pushed down to a midway. Thus, it is found that the user wishes to take a picture image by switching on of the first switch S1.

When the first switch S1 is switched on (YES in Step #20), the main controller 300 judges whether the second switch S2 is switched on or not (Step #30). When the second switch S2 is switched on, the user instructs to take image data to be recorded. The main controller 300 jumps to step #65 for taking the image by the second image pickup operation.

Alternatively, when the second switch S2 is not switched on (NO in Step #30), the user wishes to take an image data for monitor display. The integration time calculator 302 measures the luminance of the object from the output of the photosensor 301 (Step #35), and calculates the proper integration time T1 and the limit integration time T0 with using the focal length "F" and the aperture value (f-number) of the optical lens system 201 (Step #40).

When the proper integration time T1 and the limit integration time T0 are calculated, the main controller 300 selects one of the above-mentioned direct output mode, two pixel data adding mode and four pixel data adding mode in the first image pickup operation corresponding to the values T1 and T0 (Step #45), and the main controller 300 controls the image pickup device 110 for taking the image data by the above-mentioned first image pickup operation (Step #50). Details of the mode selection in the step #45 and the first image pickup operation in the step #50 will be described below. When the image data without camera shake is taken in the step #50, the main controller 300 controls the image data accumulator 307 and the image data processor 308 for displaying the monitor image on the monitor display 130 (Step #55).

Subsequently, the main controller 300 judges whether the second switch S2 is switched on or not (Step #60). When the second switch S2 is not switched on, the main controller 300 repeats the steps #15 to #60 until the second switch S2 is switched on. When the second switch S2 is switched on, the user instructs to take image data to be recorded. Thus, the integration time calculator 302 measures the luminance of the object from the output of the photosensor 301 again, even though the luminance of the object is already measured in the step #35 (Step #65). Furthermore, the integration time calculator 302 calculates the proper integration time T1, the limit integration time T0, a number of image pickup operations "C" and a control integration time T2 with using the focal length "F" and the aperture value (f-number) of the optical lens system 201 (Step #70). For example, the number of image pickup operations "C" is an integer of a value of the proper integration time T1 (sec.) divided by the limit integration time T0 (sec.), that is C=INT(T1/T0). The control integration time T2 is a value of the proper integration time T1 divided by the number "C". In this case, T2 nearly equals to T0 (T2≈T0). The control integration time T2 is not restricted by this example, any optional time shorter than the limit integration time can be used as the control integration time T2. For example, T2=T1/(C+j), ("j" is an optional integer equal to or larger than one) or T2=T1/j·C ("j" is an optional number larger than one), can be used as the control integration time T2.

When the number of image pickup operations "C" and the control integration time T2 are calculated, the main controller 300 controls the image pickup device 110 for taking the image data by the above-mentioned second image pickup operation (Step #75). Details of the second image pickup operation in the step #75 will be described below. When the image data without camera shake is taken in the step #75, the main controller 300 controls the recorder 140 for recording the final image data into the recording medium 141 (Step #80). It is possible to display a monitor image corresponding to the final image data on the monitor display 130.

When the final image data is recorded, the main controller 300 judges whether the first switch S1 is switched off or not, that is the user has detached his finger from the shutter start button 101 or not (Step #85). When the first switch S1 is not switched off, the user wishes to take the picture image, so that the main controller 300 returns to the step #30 for standing by the next image pickup operation.

When the first switch S1 is switched off (YES in Step #85), the main controller 300 judges whether the main switch is switched off or not (Step #90). When the main switch has been switched on (NO in Step #90), the main controller 300 returns to the step #20 for waiting the switching on of the first switch S1 again. Alternatively, the main switch is switched off (YES in Step #90), the main controller 300 executes the finishing operation for setting the image pickup device 110 and the taking lens unit 200 in the standby state (Step #95). After that, the main controller 300 completes the image pickup operation.

Mode Selection Subroutine

Figure 8:
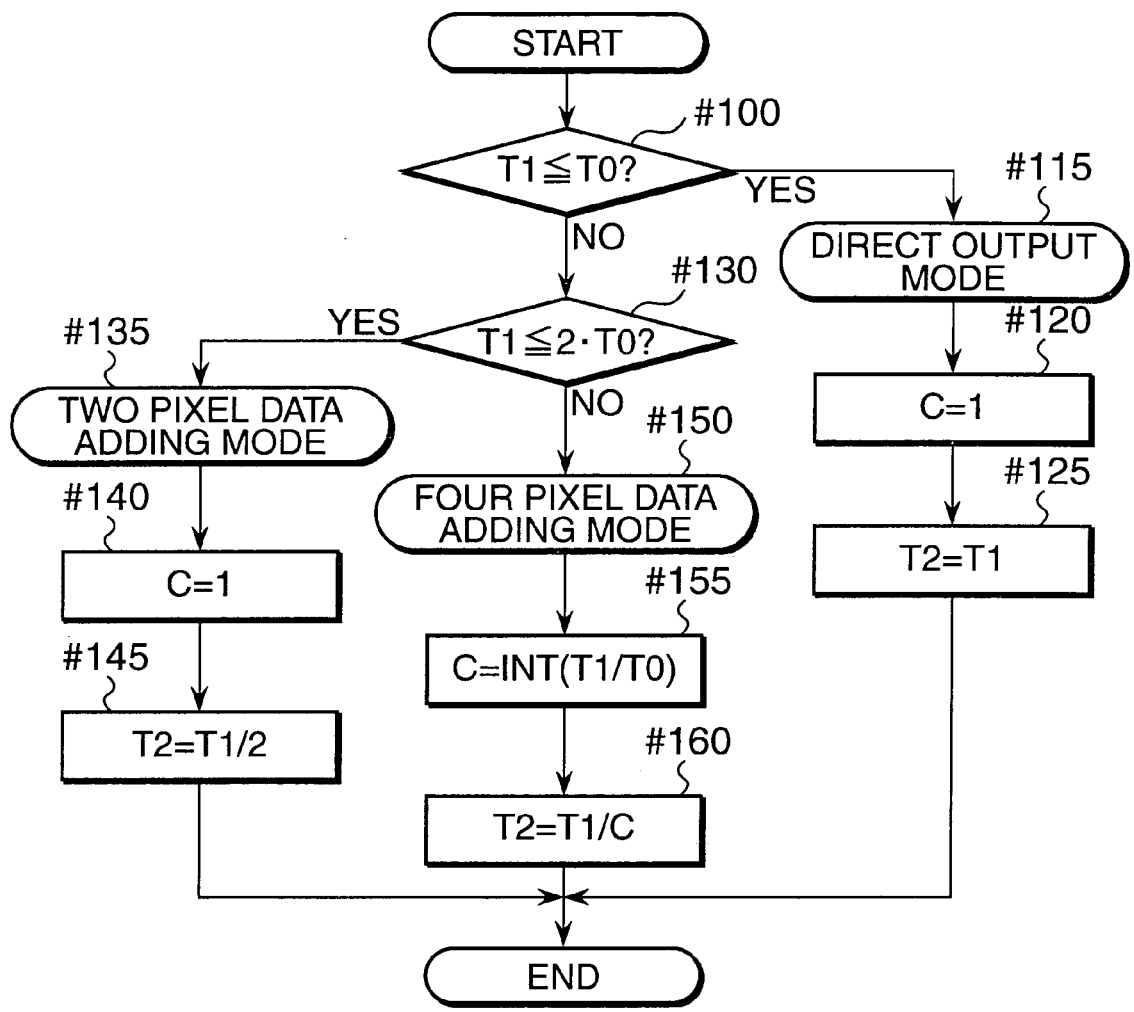
FIG. 8 is a flowchart showing a mode selection subroutine in the step #45 of the main flow shown in FIGS. 6 and 7.

Details of the mode selection subroutine in the step #45 is described with reference to FIG. 8.

When the first switch S1 is switched on but the second switch S2 is switched off, the integration time calculator 302 judges whether the proper integration time T1 is equal to or shorter than the limit integration time T0 or not (Step #100).

When the proper integration time T1 (sec.) is equal to or shorter than the limit integration time T0 (sec.) (YES in Step #100), a proper picture image without camera shake can be obtained even when the image pickup device 110 is driven by the proper integration time T1. Thus, the main controller 300 selects the direct output mode (Step #115). The image pickup number setting portion 303 sets the number of image pickup operations C=1 without any calculation (Step #120). Parallel to this operation, the integration time calculator 302 sets the value of the proper integration time T1 as the control integration time T2 (T2=T1) (Step #125).

When the proper integration time T1 (sec.) is longer than the limit integration time T0 (sec.), it may well be that the camera shake occurs in the monitor image displayed on the monitor display 130 which is formed by the image data taken by the image pickup device 110 in the proper integration time T1. Thus, the integration time calculator 302 judges whether the proper integration time T1 (sec.) is equal to or smaller than a value 2·T0 (sec.) which is the double of the limit integration time T0 (sec.) or not (Step #130).

When the proper integration time T1 is equal to or smaller than the value 2·T0 (YES in Step #130), a proper picture image without camera shake can be obtained when the image pickup device 110 is driven by the two pixel data adding mode. Thus, the main controller 300 selects the two pixel data adding mode (Step #135). The image pickup number setting portion 303 sets the number of image pickup operations C=1 without any calculation (Step #140). Parallel to this operation, the integration time calculator 302 sets the value of half of the proper integration time T1 as the control integration time T2 (T2=T1/2) (Step #145).

When the proper integration time T1 (sec.) is longer than the value 2·T0 (sec.) (NO in Step #130), it may well be that the camera shake occurs in the monitor image displayed on the monitor display 130 by the two pixel data adding mode. Thus, the main controller 300 selects the four pixel data adding mode (Step #150).

In the first embodiment, since the above-mentioned three modes are prepared, a proper picture image without camera shake cannot necessarily be obtained when the image pickup device 110 is once driven by the four pixel data adding mode. The image pickup number setting portion 303 calculates the number of image pickup operations "C" by using the proper integration time T1 and the limit integration time T0 (Step #155). Since the number of image pickup operations "C" must be an integer, so that a value of the proper integration time T1 divided by the limit integration time T0 is raised to be the integer. For example, when the proper integration time T1 is equal to or smaller than a value 4·T0 which is a quadruple of the limit integration time T0, a proper picture image without camera shake can be obtained by one image pickup operation in the four pixel data adding mode. Thus, the image pickup number setting portion 303 sets the number C=1. Subsequently, when the number of image pickup operations "C" is set, the integration time calculator 302 sets the value of the proper integration time T1 divided by the number "C" as the control integration time T2 (T2=T1/C) (Step #160).

Figure 9:
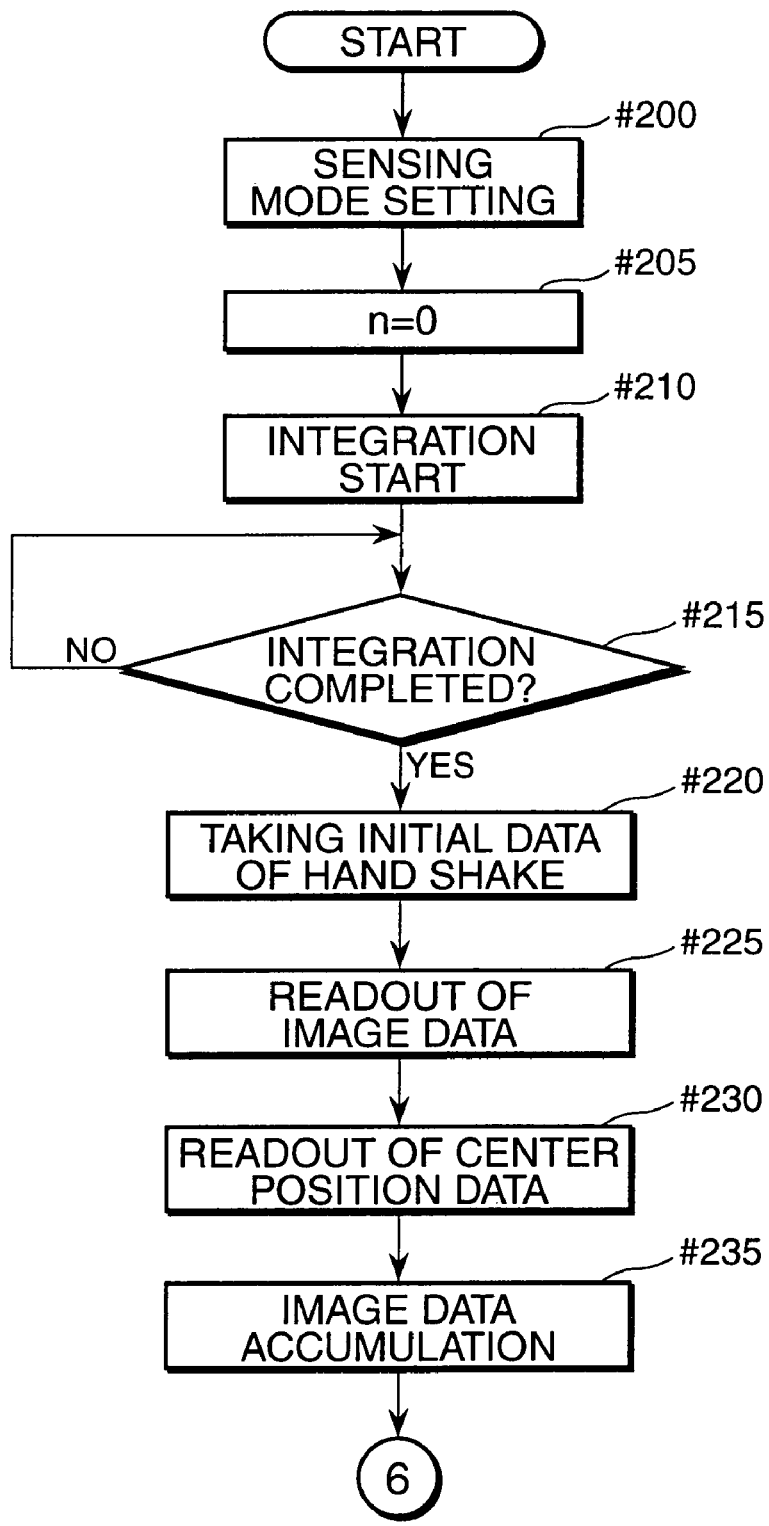
FIG. 9 is a flowchart showing an image pickup subroutine in the step #50 or #75 in the main flow shown in FIGS. 6 and 7.
Figure 10:
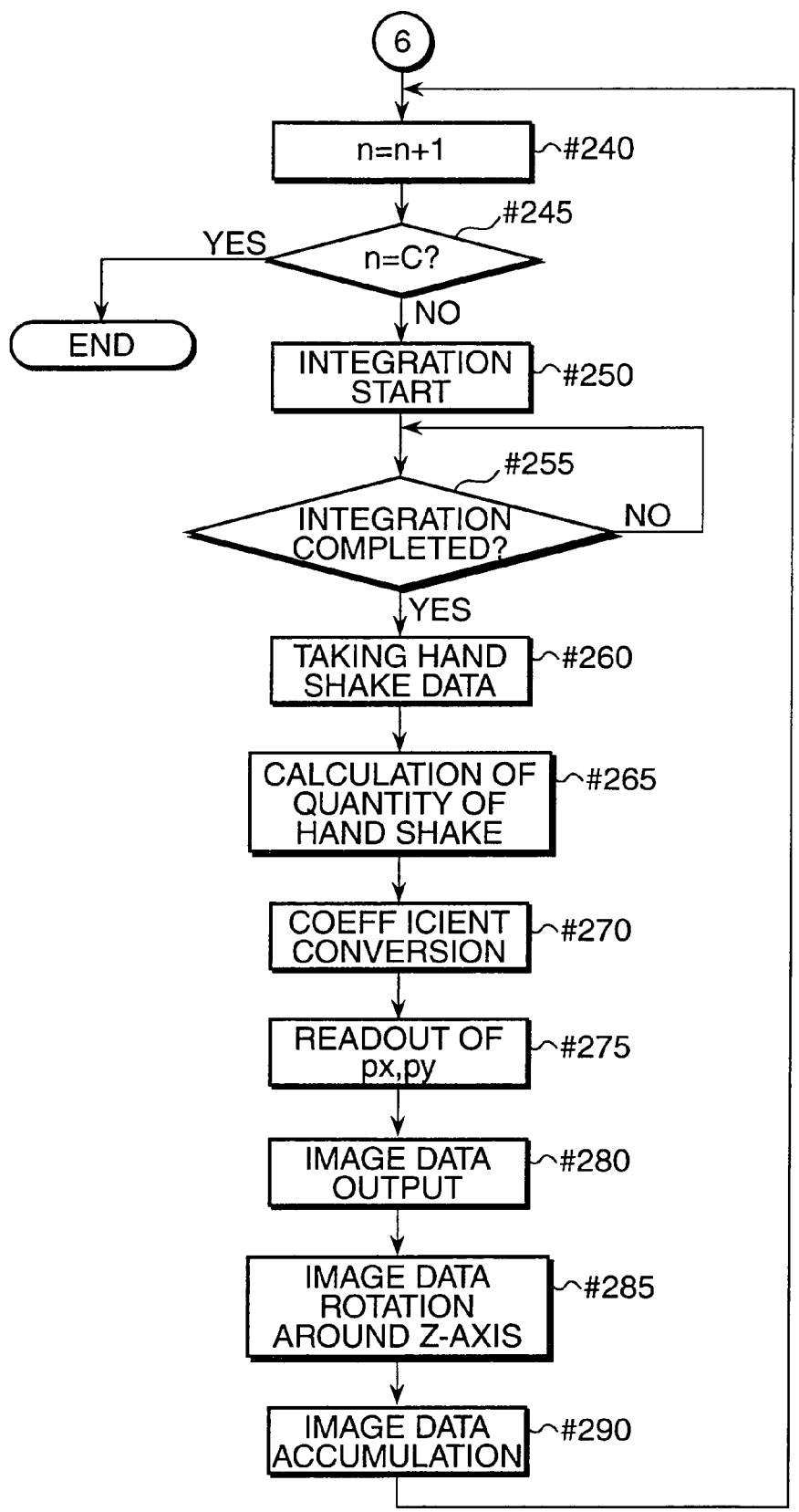
FIG. 10 is a flowchart showing a continuance of the flowchart shown in FIG. 9.

When the image pickup mode, the number of image pickup operations "C" and the control integration time T2 are set, the main controller 300 completes the mode selection subroutine, and proceeds to an image pickup subroutine shown in FIGS. 9 and 10. The first image pickup operation in the step #50 and the second image pickup operation in the step #75 are substantially the same. These two image pickup operations are described at the same time.

Image Pickup Subroutine

Details of the image pickup operations in the steps #50 and #75 are described with reference to FIGS. 9 and 10. When the image pickup subroutine is started, the main controller 300 sets a sensing mode (Step #200).

The first image pickup operation in the step #50 aims to obtain an image data used for displaying a monitor image on the monitor display 130. Thus, the correction of the image data is not necessarily perfect. It is sufficient to correct high frequency component of the image data for displaying the monitor image. Thus, only the high frequency component of the image data is corrected in the first image pickup operation in the step #50. In this case, a position of a frame of the image pickup device 110 from which the pixel data are outputted may not approach to the edges of the image pickup device 110, closely. Even when the second switch S2 is switched on for obtaining the image data to be recorded, it is possible to avoid a troublesome condition that the image data cannot be corrected. Thus, the main controller 300 selects a high frequency mode as the sensing mode so as to correct the high frequency component having frequencies from 5 to 20 Hz.

The second image pickup operation aims to obtain the image data to be recorded. Thus, it is necessary to correct the image data perfectly in all region from low frequency to high frequency (0.1 to 20 Hz). The main controller 300 selects a low frequency mode (or full region mode) as the sensing mode. In the second image pickup operation, the low frequency region starts from 0.1 Hz so as not to receive any affect due to DC drift error of the angular velocity sensors 121 to 123. When the camera is held by hand, it is sufficient to sense vibrations having frequencies from 0.1 to 20 Hz. Other vibrations having frequencies except 0.1 to 20 Hz can be regarded as noise components to be cut off.

When the sensing mode is set, the main controller 300 resets a counter "n" (n=0) for counting the number of image pickup operations (Step #205). Subsequently, the main controller 300 controls the image pickup device driver 304 for starting the integration of the pixels of the image pickup device 110 (Step #210). After starting the integration of the image pickup device 110, the image pickup device driver 304 judges whether a time period from the start of the integration of the image pickup device 110 reaches to the control integration time T2 or not, that is the integration of the image pickup device 110 is completed or not (Step #215).

When the integration of the image pickup device 110 is completed, the camera shake detector 312 takes initial data of the camera shake (Step #220). Concretely, quantities of rotation shake around the X-, Y- and Z-axes (analogous data) from the angular velocity sensors 121 to 123 are converted to digital signals "detx(0)", "dety(0)" and "detz(0)" by the sensing processors 309 to 311, and memorized in a memory.

Parallel to these operations, the main controller 300 controls the image data reader 305 for reading out the image data from the image pickup device 110 (Step #225). Furthermore, the main controller 300 takes a position data (x=0, y=0) of the center of a frame of the image pickup device 110 from which the pixel data are outputted (Step #230). The image data (present image data) read out from the image pickup device 110 at this time is the first image data, so that the image data is not corrected by the image data corrector 306, and transmitted to the image data accumulator 307 to be accumulated temporally (Step #235).

When the image data is accumulated in the image data accumulator 307, the main controller 300 increases the number of the counter "n" by one (n=n+1) (Step #240), and judges whether the counter "n" reaches to the number of image pickup operations "C" or not (Step #245). In this case, the image pickup operation is the first, so that the counter "n" equals one (n=1). When the image data are taken at least twice (NO in Step #245), the main controller 300 controls the image pickup device driver 304 for starting the integration of the pixels of the image pickup device 110 at second times (Step #250). When the integration of the image pickup device 110 starts, the image pickup device driver 304 judges whether a time period from the start of the integration of the image pickup device 110 reaches to the control integration time T2 or not, that is the integration of the image pickup device 110 is completed or not (Step #255).

When the integration of the image pickup device 110 is completed, the camera shake detector 312 takes data of the camera shake "detx(n)", "dety(n)" and "detz(n)" (at this time, n=1) (Step #260). When the data of the camera shake are taken, the main controller 300 calculates quantities of camera shake "$\Delta detx$", "$\Delta dety$" and "$\Delta detz$" by using the initial data of the camera shake (Step #265). The quantities of camera shake are calculated by the following equations.

$\Delta detx = detx(n) - detx(0)$ $\Delta dety = dety(n) - dety(0)$ $\Delta detz = detz(n) - detz(0)$ When the quantities of camera shake are calculated, the main controller 300 executes coefficient conversion for converting the quantities of camera shake which are the sensing quantity to quantities for shake correction (Step #270). The coefficient conversion is executed by the following equations.

$$px = ax \cdot \Delta ety$$

$$py = ay \cdot \Delta detx$$

$$degz = az \cdot \Delta detz$$

Hereupon, the symbol "ax" designates a coefficient for calculating an image data reading position in the X-direction from a quantity of rotation shake "$\Delta ety$" around the Y-axis. The symbol "ay" designates a coefficient for calculating an image data reading position in the Y-direction from a quantity of rotation shake "$\Delta detx$" around the X-axis. The symbol "az" designates a coefficient for calculating a rotation quantity of the image "degz" around the Z-axis from a quantity of rotation shake "$\Delta detz$" around the Z-axis.

When the coefficient conversion is completed, the image data corrector 306 reads position correction data "px" and "py" which are used for correcting the position of the frame of the image pickup device 110 in the X-direction and the Y-direction (Step #275). The main controller 300 shifts the center of the frame to a corrected position by using the position correction data "px" and "py". After that, the main controller 300 controls the image data reader 305 for reading out the pixel data (quantity of electric charge in each pixel included in the frame) as the image data (Step #280).

When the image data with respect to a predetermined region is read out, the image data corrector 306 rotates the image data by "-degz" using the rotation quantity of image "degz" around the Z-axis (Step #285). By these data correction, error component due to the movement of the camera in the time period between the first image pickup operation and the second image pickup operation is removed from the image data taken on the second image pickup operation. The corrected image data is accumulated in the image data accumulator 307 (Step #290). In the first embodiment, the image data is corrected soon after being taken by the image pickup operation and the corrected image data is accumulated in the image data accumulator 307, so that a memory temporally for memorizing a plurality of the original image data which are not corrected is not necessary. When the speed for processing the image data is fast, there is substantially no waiting time for displaying the monitor image on the monitor display 130 after the image pickup operation.

When the corrected image data is accumulated, the main controller 300 returns to the step #240 and increases the counter "n" by one and judges whether the counter "n" reaches to the number of image pickup operations "C" or not (Step #245). The main controller 300 repeats the steps #250 to #290 until the counter "n" reaches to the number of image pickup operations "C". When the counter "n" reaches to the number of image pickup operations "C", the final image data having proper quantity of electric charges corresponding to a proper exposure value is accumulated in the image data accumulator 307. The main controller 300 completes the image pickup subroutine and proceeds to the monitor image display subroutine in the step #55 or the image data recording subroutine in the step #80.

Figure 11A:
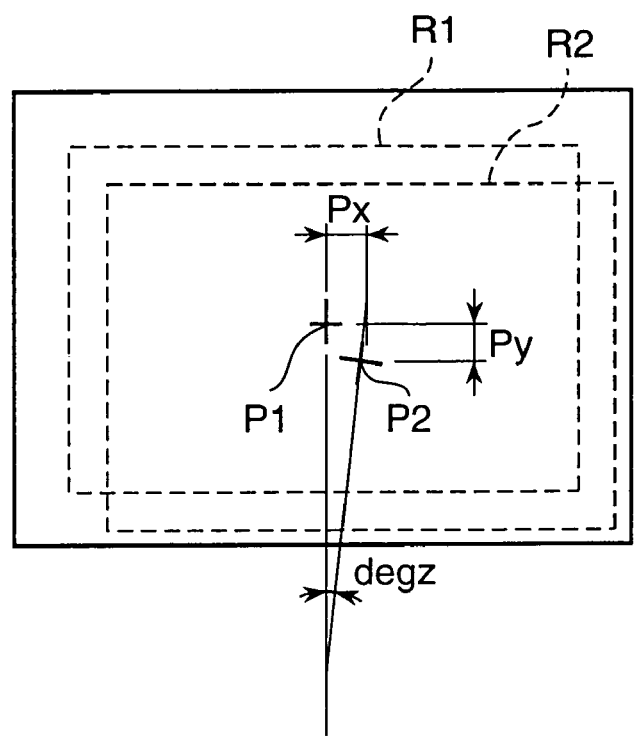
FIGS. 11A and 11B are drawings showing image data correction processes in the first embodiment.

The image data correction processes in the steps #275 to #285 is described with reference to FIGS. 11A and 11B. In FIG. 11A, a symbol "P1" shows a center point of a first readable image frame R1 which is taken by the first image pickup operation. A symbol "P2" shows a center point of a second readable image frame R2 which is taken by the second image pickup operation. A cross on the center point P1 shows spatial frequencies in the X-direction and the Y-direction in the first image. A cross on the center point P2 shows the rotation of the cross on the center point P1 around the Z-axis.

As can be seen from FIG. 11A, the image on the image pickup device 110 is moved by (px, py) in the X-direction and the Y-direction due to the rotation shake of the camera around the X-axis and the Y-axis in the time period between the first image pickup operation and the second image pickup operation. Furthermore, the image is rotated by the angle "degz" around the Z-axis due to the rotation shake around the Z-axis.

Rectangular frames R1 and R2 illustrated by dotted lines in FIG. 11A respectively show first and second readable image frame corresponding to the center points P1 and P2 from which the pixel data of the pixels included therein are read out. When the second readable image frame R2 is moved by (-px, -py) in the X-direction and the Y-direction, the frame R2 completely overlaps the first readable image frame R1. The image data readout from the second readable image frame R2, however, is still rotated by the angle "degz" around the Z-axis with respect to the image data read out from the first readable image frame R1. Thus, it is impossible to composite the image data read out from the second readable image frames R2 on the image data read out from the first readable image frame R1 as it is.

Figure 11B:
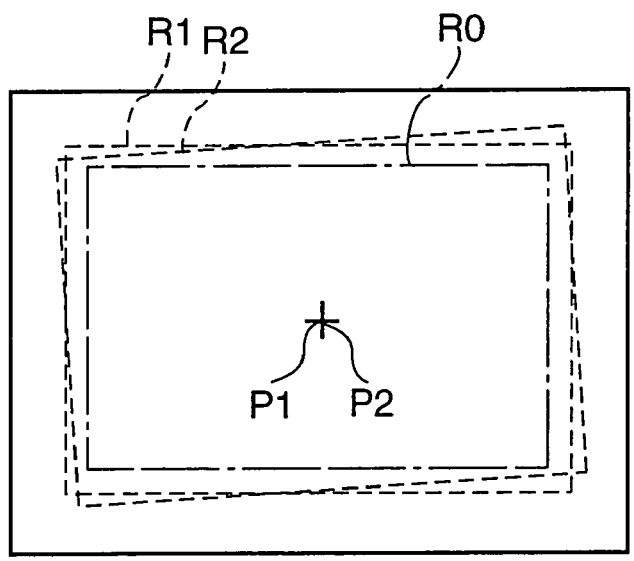

As shown in FIG. 11B, under the condition that the image data read out from the second readable image frame R2 is moved in a manner so that the center point P2 coincides with the center point P1, the image data read out from the second readable image frame R2 is rotated by "-degz" around the center point P2. By such an image data correction processes for moving of the second readable image frame R2 in the X-direction and the Y-direction and for rotating the second readable image frame R2 around the Z-axis, the image data obtained in the second image pickup operation can composite the image data obtained in the first image pickup operation completely coinciding with each other. Furthermore, the overlapped region of the first readable image frame R1 and the second readable image frame R2 is larger than the actual image frame R0 illustrated by one dotted chain line, there is no lack of the image data (or pixel data) and no variation of the exposure in the vicinity of the outer periphery of the image.

The image data correction in the X-direction and the Y-direction can be executed by moving the image data read out from the readable image frame R2 in the X-direction and the Y-direction. It can be realized by a software process evenly for adding or subtracting a predetermined number of pixels corresponding to the moving quantity to or from addresses of pixel data which are to be read out in the X-direction and the Y-direction.

On the other hand, it is very difficult to correct the rotation shake of the image data around the Z-axis by a software process, since the number of pixels which are to be added or subtracted to or from the address of each pixel varies corresponding to a distance of the pixel against the center point P2 of the second readable image frame R2. Furthermore, a time period necessary for correction of image data by the software process becomes much longer. Thus, it is preferable to process the rotation of the image data around the Z-axis by a hardware process such as using an exclusive IC (Integrated Circuit).

With respect to the order of the correction of the rotation shakes around the X-, Y- and Z-axes, it is preferable that the movements of the image data in the X-direction and the Y-direction are executed prior to the rotation of the image data around the Z-axis. When the rotation of the image data around the Z-axis is executed by the exclusive IC, the image data can be rotated around only the center point P1 of the first readable image frame R1 or the actual image frame R0. If the image data is rotated around the Z-axis prior to the movements in the X-direction and the Y-direction, the center point P2 of the second readable image frame R2 cannot coincide with the center point P1 as shown in FIGS. 12A and 12B.

Figure 12A:
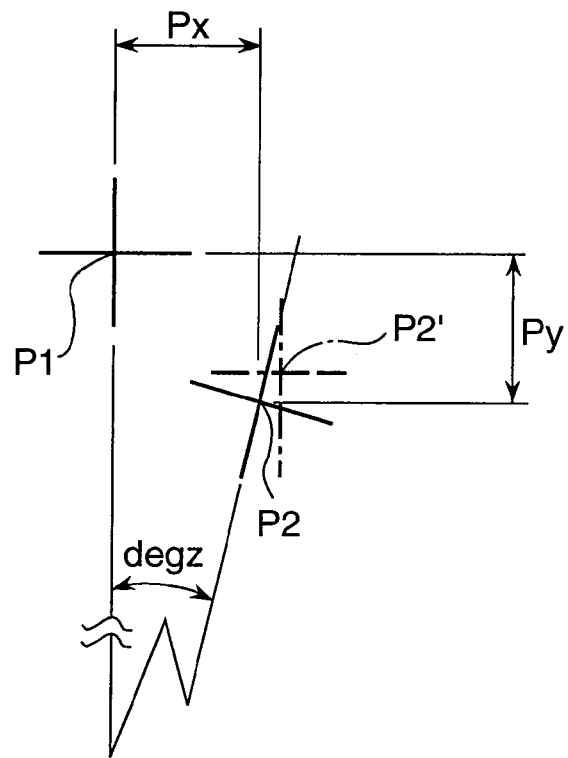
FIGS. 12A and 12B are drawings showing missing case of image data correction.
Figure 12B:
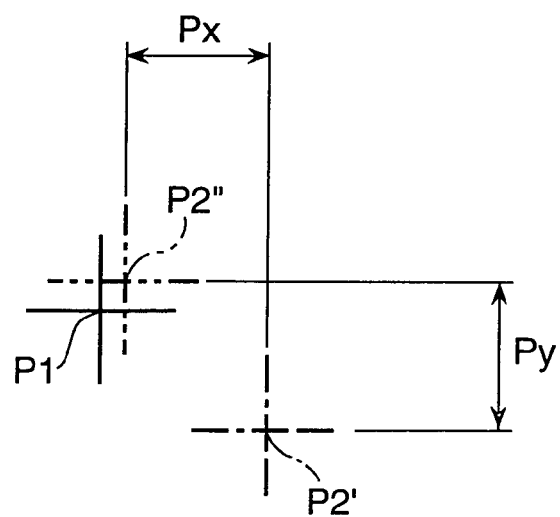

FIG. 12A shows enlarged crosses on the center points P1 and P2. A center point P2' and a cross on the center point P2' illustrated by one-dotted chain line in FIG. 12A shows the point and the cross which are rotated by "−degz" around the center point P1 from the center point P2. A center point P2" and a cross on the center point P2" illustrated by two-dotted chain line in FIG. 12B shows the point and the cross which are moved by (−px, −py) in the X-direction and the Y-direction from the center point P2' in FIG. 12A. As can be seen from FIG. 12B, the representation of the center point P2 cannot coincide with the center point P1. If the image data corrected by these order is forcibly composited to the first image data, a picture image having contours of double-line as if an off-axis aberration which are shifted in the X-direction and the Y-direction. Thus, the order of the correction of the rotation shakes around the X-, Y- and Z-axes is important.

Monitor Image Display Subroutine

Figure 13:
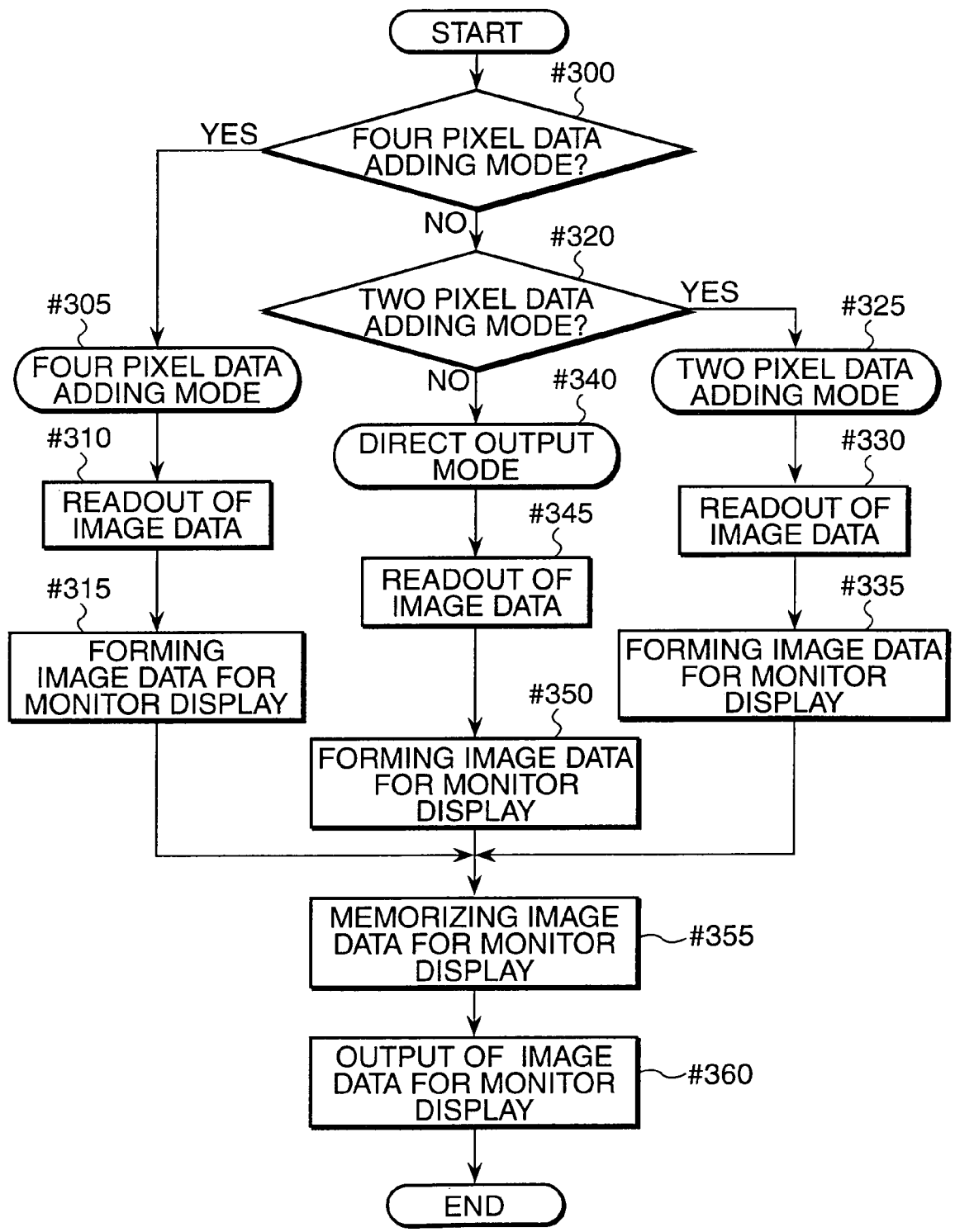
FIG. 13 is a flowchart showing a monitor image display subroutine in the first embodiment.

Details of the monitor image display subroutine in the step #55 is described with reference to FIG. 13. As mentioned above, the image pickup device 110 has about 1.4 million (1400×1000) pixels. The monitor display 130, however, has only about 80 thousands pixels. Thus, one pixel data which is used for the monitor display can be composited from sixteen pixel data from the image pickup device 110.

When the image data is obtained in the step #50, the image data processor 308 judges whether the mode set in the step #45 is the four pixel data adding mode or not (Step #300). When the four pixel data adding mode is selected (YES in Step #300), the image data processor 308 executes the four pixel data adding mode for forming an image data for monitor display (Step #305). Details of the four pixel data adding mode is described below.

The quantity of the electric charge stored in each pixel of the image data accumulator 307 in the step #50 is a quarter of a proper quantity corresponding to the proper exposure. When the electric charges in four pixels adjoining in the vertical direction and the horizontal direction are added, a proper image data which is usable for the display of the monitor image on the monitor display 130 can be obtained. Thus, the image data processor 308 reads out the image data accumulated in the image data accumulator 307 (Step #310). After that, the image data processor 308 takes four (2×2) pixel data adjoining in the vertical direction and the horizontal direction among sixteen (4×4) pixel data arranged four in the vertical direction and the horizontal direction, and adds the four pixel data as one pixel data of the monitor display 130. Alternatively, the image data processor 308 adds sixteen (4×4) pixel data arranged four in the vertical direction and the horizontal direction, and divides the added data by four as one pixel data of the monitor display 130. The image data processor 308 executes the above-mentioned processes with respect to 80 thousand pixels of the monitor display 130 for forming an image data for monitor display (Step #315).

When the four pixel data adding mode is not selected in the step #45 (NO in Step #300), the image data processor 308 judges whether the mode set in the step #45 is the two pixel data adding mode or not (Step #320). When the two pixel data adding mode is selected (YES in Step #320), the image data processor 308 executes the two pixel data adding mode for forming an image data for monitor display (Step #325). Details of the two pixel data adding mode is described below.

The quantity of the electric charge stored in each pixel of the image data accumulator 307 in the step #50 is a half of a proper quantity corresponding to the proper exposure. When the electric charges in two pixels adjoining in the horizontal direction are added, a proper image data which is usable for the display of the monitor image on the monitor display 130 can be obtained. Thus, the image data processor 308 reads out the image data accumulated in the image data accumulator 307 (Step #330). After that, the image data processor 308 takes two pixel data adjoining in the horizontal direction among sixteen (4×4) pixel data arranged four in the vertical direction and the horizontal direction, and adds the two pixel data as one pixel data of the monitor display 130. Alternatively, the image data processor 308 adds sixteen (4×4) pixel data arranged four in the vertical direction and the horizontal direction, and divides the added data by eight as one pixel data of the monitor display 130. The image data processor 308 executes the above-mentioned processes with respect to 80 thousand pixels of the monitor display 130 for forming an image data for monitor display (Step #335).

When the direct output mode is selected in the step #45 (NO in Step #320), the image data processor 308 executes the direct output mode for forming an image data for monitor display (Step #340). Details of the direct output mode is described below.

The quantity of the electric charge stored in each pixel of the image data accumulator 307 in the step #50 is just the proper quantity corresponding to the proper exposure. Thus, the image data processor 308 reads out the image data accumulated in the image data accumulator 307 (Step #345). After that, the image data processor 308 takes any one pixel data among sixteen (4×4) pixel data arranged four in the vertical direction and the horizontal direction as one pixel data of the monitor display 130. Alternatively, the image data processor 308 adds sixteen (4×4) pixel data arranged four in the vertical direction and the horizontal direction, and divides the added data by sixteen as one pixel data of the monitor display 130. The image data processor 308 executes the above-mentioned processes with respect to 80 thousand pixels of the monitor display 130 for forming an image data for monitor display (Step #350).

When the image data for monitor display is formed, the image data is memorized in a data memory in the image data processor 308. Subsequently, the image data processor 308 converts the image data for monitor display which are analogous signals to video signals such as NTSC or PAL or digital signals corresponding to colors of R (Red), G (Green) and B (Blue). The image data processor 308 outputs the converted signals to the monitor display 130 at a predetermined interval (Step #360). When all the converted signals are outputted, the main controller 300 completes the monitor image display subroutine.

Image Data Recording Subroutine

Figure 14:
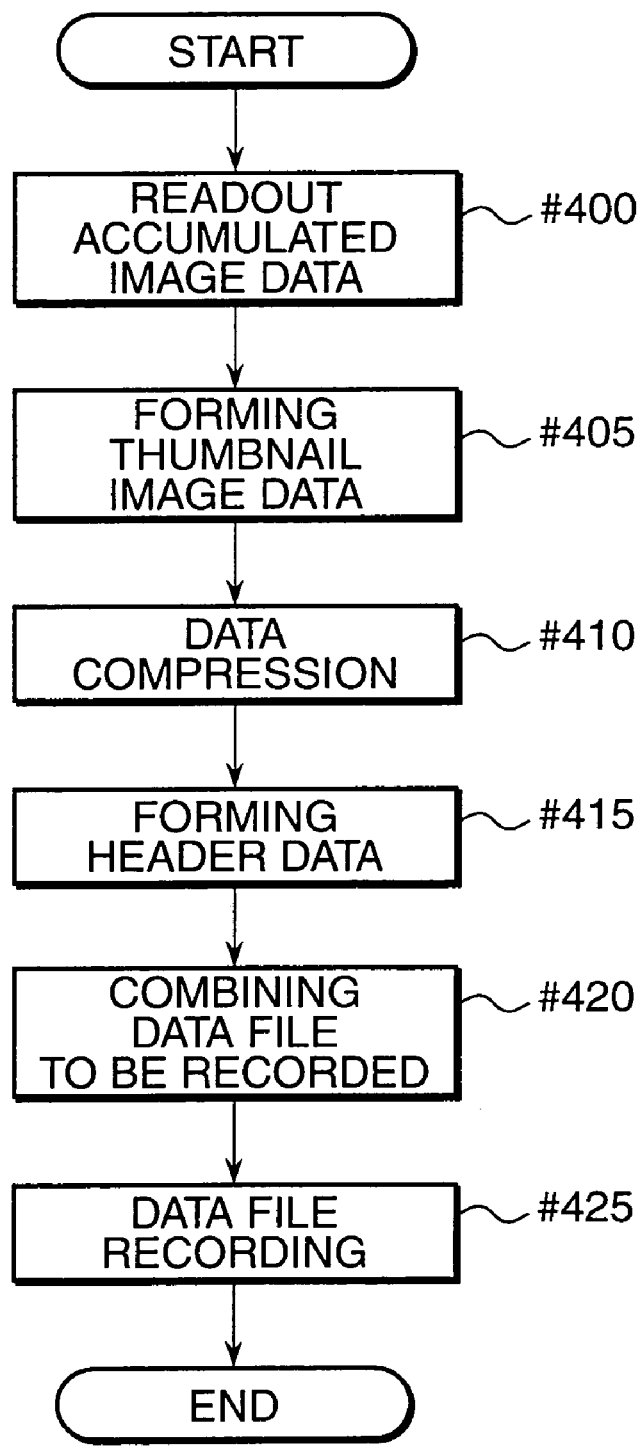
FIG. 14 is a flowchart showing an image data recording subroutine in the first embodiment.

Details of the image data recording subroutine in the step #80 is described with reference to FIG. 14. When the image data to be recorded is accumulated in the image data accumulator in the step #75, the main controller 300 controls the recorder 140 for reading out the image data accumulated in the image data accumulator 307 (Step #400). The recorder 140 forms a thumbnail image data (for example, 100×140 pixels) used for monitor display or for confirming the contents of the image by thinning the readout image data (Step #405). Subsequently, the recorder 140 compresses the image data by using, for example, JPEG (Joint Photographic Experts Group) compression software (Step #410).

The recorder 140 further forms predetermined header data including a file name, a resolution of the image, a compression ratio, and so on (Step #415). The header data, the thumbnail image data and the compressed image data are combined as one data file (Step #420), and the combined data file is recorded into the recording medium 141 (Step #425). When the data file is recorded, the main controller 300 completes the image data recording subroutine.

Second Embodiment

A second embodiment of this invention is described with reference to the figures. A configuration and an arrangement of the elements of the digital camera in the second embodiment are substantially the same as those of the above-mentioned first embodiment, so that the explanations of the common configurations are omitted.

Figure 15:
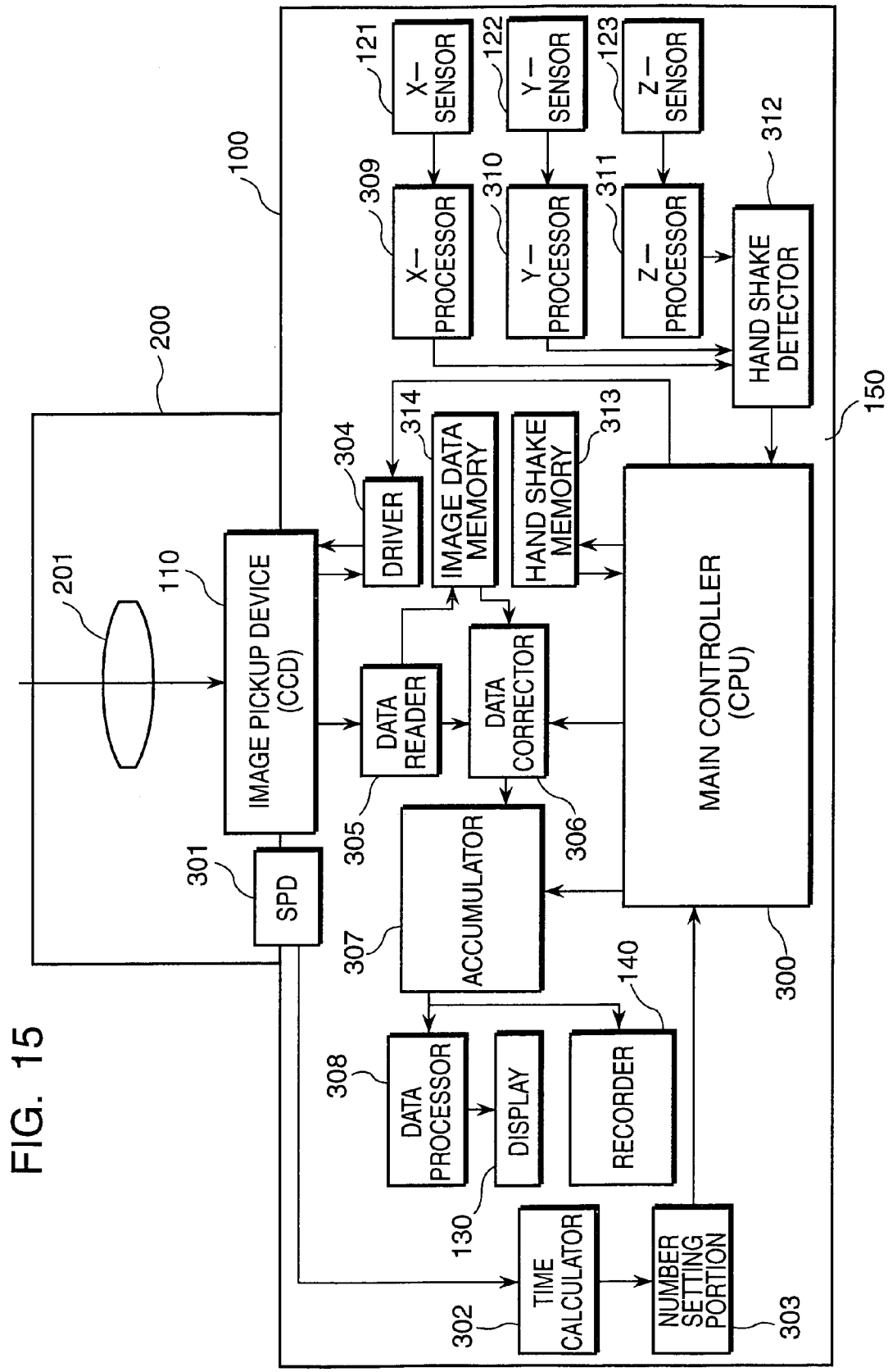
FIG. 15 is a block diagram showing a configuration of a control circuit of a digital camera in a second embodiment of this invention.

A block diagram of a control circuit 150 in the second embodiment is shown in FIG. 15. In the above-mentioned first embodiment, when the image data is taken on and after the second image pickup operation, the image data is corrected soon by the image data corrector 306 and the corrected image data are accumulated in the image data accumulator 307. In the second embodiment, the image data taken on and after the second image pickup operation are memorized temporally in an image data memory portion 314, and results of camera shake detection are also memorized in a camera shake memory portion 313.

When a predetermined number of image data are taken, the main controller 300 controls the image data corrector 306 for correcting the image data taken on and after the second image pickup operation with reference to the results of camera shake detection memorized in the camera shake memory portion 313, and the corrected image data (electric charges of the pixels) are serially accumulated on the image data accumulated in the image data accumulator 307.

Figure 16:
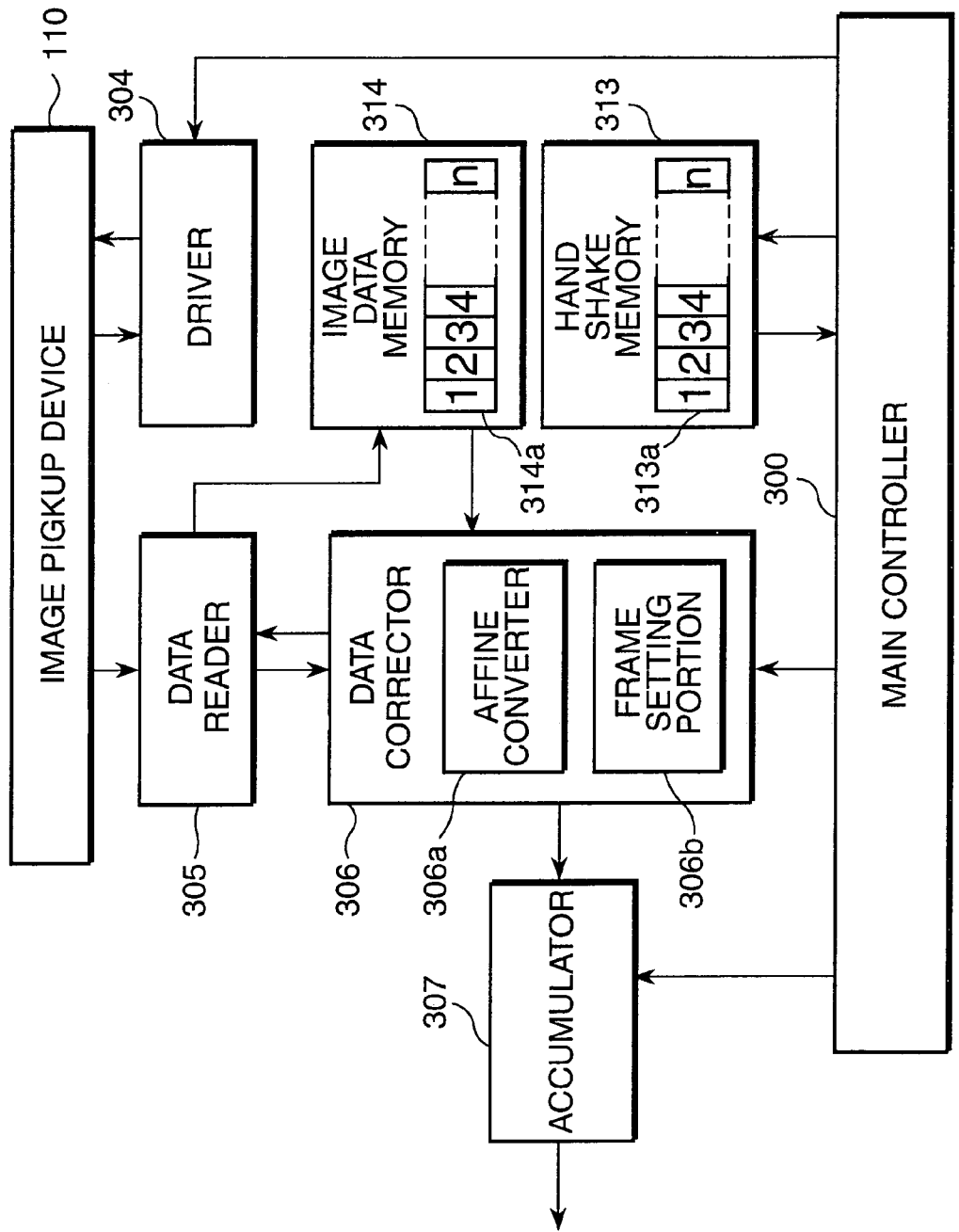
FIG. 16 is a block diagram showing details of a main portion of the control circuit in the second embodiment.

A main portion of the control circuit 150 with respect to the image data correction is illustrated in FIG. 16. The camera shake memory portion 313 and the image data memory portion 314 respectively have a plurality of memory regions 313a and 314a corresponding to the number of image data to be taken for forming the same final image data. When an image data is taken by the image pickup device 110, the image data is memorized in an any memory region 314a corresponding to the number of image pickup operation "C" in the image data memory portion 314. The result of the camera shake detection in the image pickup operation during which the image data is taken is memorized in any memory region 313a corresponding to the number of image pickup operation "C" in the camera shake memory portion 313.

The data with respect to the results of camera shake does not need so large memory capacity. It, however, is preferable to set the number of memory regions 313a in the camera shake memory portion 313 to be larger for leaving a margin. For example, when the camera shake is prevented within three steps of the exposure value (3 EV), eight memory regions 313a are prepared to enable for memorizing eight ($2^3$=8) data. The steps of the exposure value to be prevented the camera shake and the number of the memory region 313a are not restricted by this example.

The same number as the memory regions 313a is set to be the number of the memory regions 314a in the image data memory portion 314 corresponding to the steps of the exposure value to be prevented the camera shake. In the second embodiment, a capacity of a memory for memorizing one image data taken by the image pickup device 110 is about 1.9 MB (megabyte). When eight image data at the maximum are memorized without compression, a very large capacity of the memory is necessary, so that it will be the cause of expensiveness of the digital camera. Thus, it is preferable to compress the image data before memorizing the image data, if necessary. Details of the compression of the image data will be described below.

As can be seen from FIG. 16, the image data corrector 306 includes an affine converter 306a and a frame setting portion 306b. In the second embodiment, the image data corrector 306 execute the affine conversion as the image data correction, by which rotation shake s around the X-, Y- and Z-axes are corrected at the same time. Details of the affine conversion will be described below. Furthermore, a method for reading out the pixel data of the image pickup device 110 as the image data will be described below.

Basic Motion Sequence (Main Routine)

Figure 17:
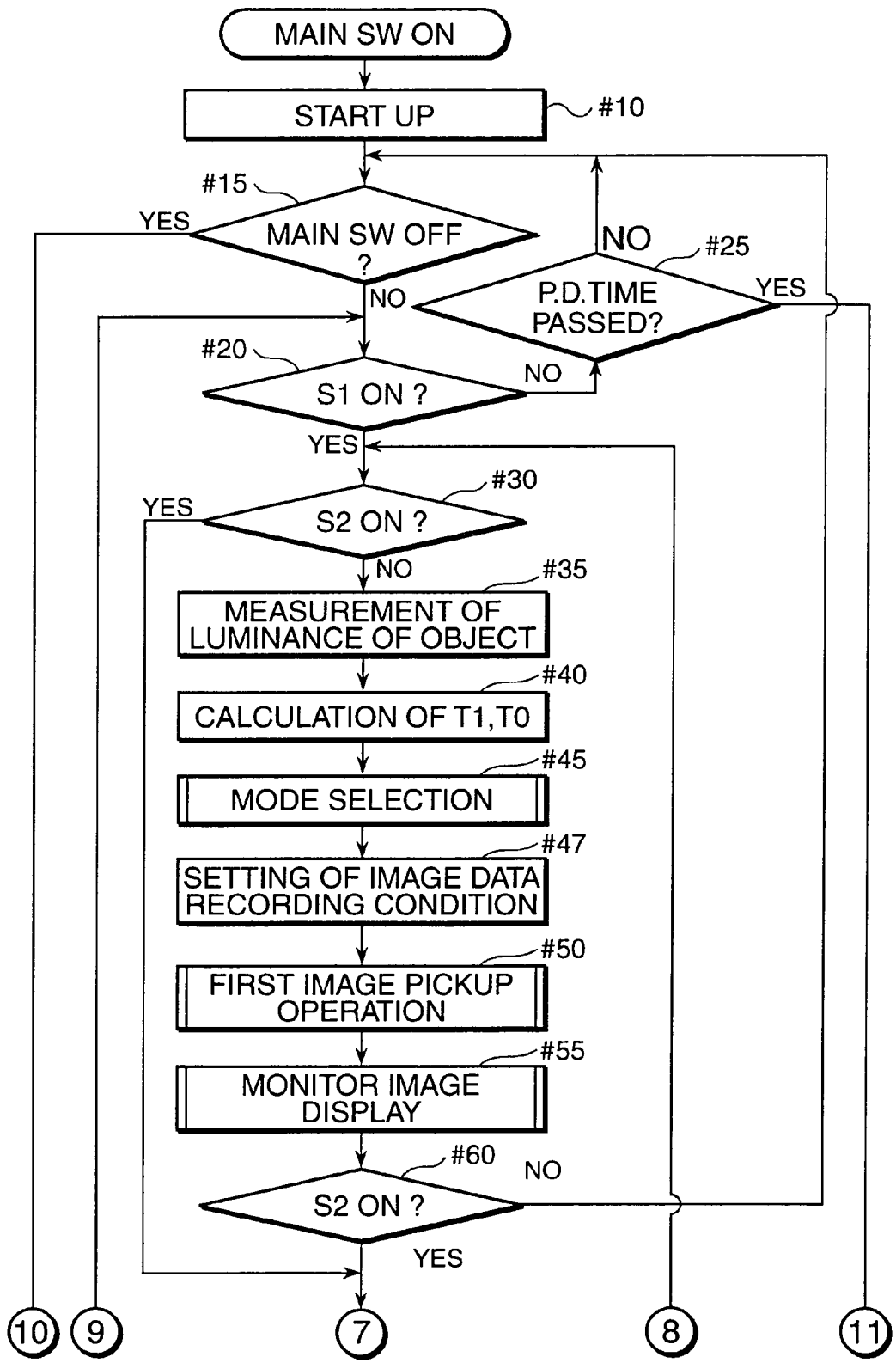
FIG. 17 is a flowchart showing a basic motion sequence of the digital camera in the second embodiment.
Figure 18:
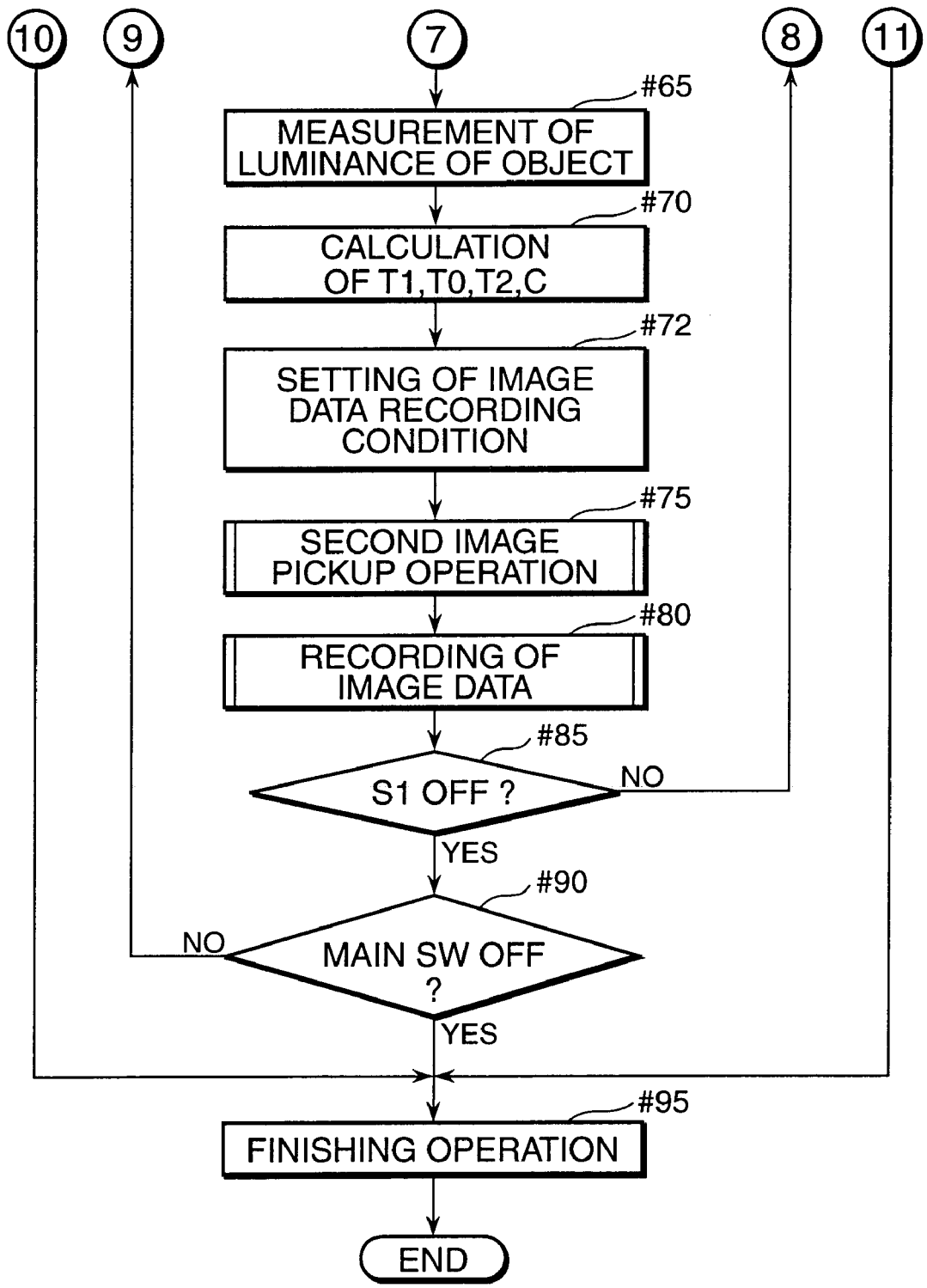
FIG. 18 is a flowchart showing a continuance of the flowchart shown in FIG. 17.

A basic motion sequence of the digital camera in the second embodiment is described with reference to flowcharts shown in FIGS. 17 and 18.

When a main switch (not shown in the figure) of the digital camera 100 is switched on, the main controller 300 executes a start up operation by which the image pickup device 110 is initialized and the taking lens unit 200 is set to be used for taking the image (Step #10). Subsequently, the main controller 300 judges whether the main switch is turned off or not (Step #15). When the main switch has been switched on (NO in Step #15), the main controller 300 further judges whether the first switch S1 of the shutter start button 101 is switched on or not (Step #20). When the first switch S1 is switched off (No in Step #20), the main controller 300 judges whether a predetermine time has passed from the switching on of the main switch or not (Step #25). When the first switch S1 has not been switched on during the predetermine time (YES in Step #25), the main controller 300 jumps to a finishing operation in step #95 for preventing the waste of the battery. When the main switch is switched off in the step #15, the main controller 300 jumps to the step #95.

When the predetermined time has not passed in the step #25, the main controller 300 waits the first switch S1 being switched on with confirming the main switch has been switched on. As mentioned above, the first switch S1 is switched on when a finger of the user is touched on the shutter start button 101 or when the shutter start button 101 pushed down to a midway. Thus, it is found that the user wishes to take a picture image by switching on of the first switch When the first switch S1 is switched on (YES in Step #20), the main controller 300 judges whether the second switch S2 is switched on or not (Step #30). When the second switch S2 is switched on, the user instructs to take image data to be recorded. The main controller 300 jumps to step #65 for taking the image by the second image pickup operation.

Alternatively, when the second switch S2 is not switched on (NO in Step #30), the user wishes to take an image data for monitor display. The integration time calculator 302 measures the luminance of the object from the output of the photosensor 301 (Step #35), and calculates the proper integration time T1 and the limit integration time T0 with using the focal length "F" and the aperture value (f-number) of the optical lens system 201 (Step #40).

When the proper integration time T1 and the limit integration time T0 are calculated, the main controller 300 selects one of the above-mentioned direct output mode, two pixel data adding mode and four pixel data adding mode in the first image pickup operation corresponding to the values T1 and T0 (Step #45). When the image pickup mode is selected, the main controller 300 sets the image data recording condition such as the data compression being executed or not and the method for compressing the image data corresponding to the memory capacity of the image data memory portion 314 and the number of image pickup operation, since a plurality of image data are taken in the four pixel data adding mode, especially (Step #47). When the image data recording condition is set, the main controller 300 controls the image pickup device 110 for taking the image data by the above-mentioned first image pickup operation (Step #50). Details of the mode selection in the step #45 and the first image pickup operation in the step #50 will be described below. When the image data without camera shake is taken in the step #50, the main controller 300 controls the image data accumulator 307 and the image data processor 308 for displaying the monitor image on the monitor display 130 (Step #55).

Subsequently, the main controller 300 judges whether the second switch S2 is switched on or not (Step #60). When the second switch S2 is not switched on, the main controller 300 repeats the steps #15 to #60 until the second switch S2 is switched on. When the second switch S2 is switched on, the user instructs to take image data to be recorded. Thus, the integration time calculator 302 measures the luminance of the object from the output of the photosensor 301 again, even when the luminance of the object is already measured in the step #35 (Step #65). Furthermore, the integration time calculator 302 calculates the proper integration time T1, the limit integration time T0, a number of image pickup operations "C" and a control integration time T2 with using the focal length "F" and the aperture value (f-number) of the optical lens system 201 (Step #70). For example, the number of image pickup operations "C" is an integer of a value of the proper integration time T1 (sec.) divided by the limit integration time T0 (sec.), that is C=INT(T1/T0). The control integration time T2 is a value of the proper integration time T1 divided by the number "C". In this case, T2 nearly equals to T0 (T2≈T0). The control integration time T2 is not restricted by this example, any optional time shorter than the limit integration time can be used as the control integration time T2. For example, T2=T1/(C+j), ("j" is an optional integer equal to or larger than one) or T2=T1/j·C ("j" is an optional number larger than one), can be used as the control integration time T2.

When the number of image pickup operations "C" and the control integration time T2 are calculated, the main controller 300 sets the image data recording condition such as the data compression being executed or not and the method for compressing the image data corresponding to the memory capacity of the image data memory portion 314 and the number of image pickup operation (Step #72). Subsequently, the main controller 300 controls the image pickup device 110 for taking the image data by the above-mentioned second image pickup operation (Step #75). Details of the setting of the image data recording condition in the step #72 and the second image pickup operation in the step #75 will be described below. When the image data without camera shake is taken in the step #75, the main controller 300 controls the recorder 140 for recording the final image data into the recording medium 141 (Step #80). It is possible to display an image corresponding to the final image data on the monitor display 130.

When the final image data is recorded, the main controller 300 judges whether the first switch S1 is switched off or not, that is the user has detached his finger from the shutter start button 101 or not (Step #85). When the first switch S1 is not switched off, the user wishes to take the picture image, so that the main controller 300 returns to the step #30 for standing by the next image pickup operation.

When the first switch S1 is switched off (YES in Step #85), the main controller 300 judges whether the main switch is switched off or not (Step #90). When the main switch has been switched on (NO in Step #90), the main controller 300 returns to the step #20 for waiting the switching on of the first switch S1 again. Alternatively, the main switch is switched off (YES in Step #90), the main controller 300 executes the finishing operation for setting the image pickup device 110 and the taking lens unit 200 in the standby state (Step #95). After that, the main controller 300 finishes the image pickup operation.

The mode selection subroutine in the step #45, the monitor image display subroutine in the step #55 and the image data recording subroutine in the step #80 are the same as those in the first embodiment, so that the explanation of them are omitted.

Image Pickup Subroutine

Details of the image pickup operations in the steps #50 and #75 are described with reference to FIGS. 19 and 20. When the image pickup subroutine is started, the main controller 300 sets a sensing mode (Step #500).

Similar to the above-mentioned first embodiment, in the first image pickup operation in the step #50, the main controller 300 selects a high frequency mode for correcting high frequency component, for example, 5 to 20 Hz. In the second image pickup operation, the main controller 300 selects a low frequency mode for correcting the image data perfectly in all region from low frequency to high frequency component, for example, 0.1 to 20 Hz.

When the sensing mode is set, the main controller 300 resets a first counter "n" (n=1) for counting the number of image pickup operations (Step #505). Subsequently, the main controller 300 controls the image pickup device driver 304 for starting the integration of the pixels of the image pickup device 110 (Step #510). Parallel to these operations, the camera shake detector 312 takes data of the camera shake, that is, the quantities of the rotation around the X-, Y- and Z-axes from the angular velocity sensors 121, 122 and 123 via the sensing processors 309, 310 and 311 (Step #515).

After starting the integration of the image pickup device 110, the image pickup device driver 304 judges whether a time period from the start of the integration of the image pickup device 110 reaches to the control integration time T2 or not, that is the integration of the image pickup device 110 is completed or not (Step #520).

When the integration of the image pickup device 110 is completed, the camera shake detector 312 memorizes the sensing data "detxn", "detyn" and "detzn" (in this case, n=1) of the camera shake into the corresponding memory region 313a in the camera shake memory portion (Step #525).

Subsequently, the frame setting portion 306b sets a frame from which the pixel data are outputted among the pixels in the image pickup device 110 (Step #530). Details for setting the frame will be described.

In a first method, the position of the center of the frame is fixed on the position (0, 0) of the center of the photosensing plane of the image pickup device 110, and the size of the frame is gradually enlarged with reference to the quantity of the camera shake. A size of the frame in the X-direction is designated by a symbol "qx", a size of the frame in the Y-direction is designated by a symbol "qy", and the number of the first counter is designated by a symbol "n". The sizes "qx" and "qy" are shown by the following equations.

$qx=1400+(n-1)\cdot 20$ $qy=1000+(n-1)\cdot 20$

As can be seen from the above-mentioned equations, the size of the frame will be enlarged by repeating the image pickup operations. Since the size or area of the photosensing plane of the image pickup device 110 is limited, the number of image pickup operation in the first method has a limit.

In a second method, the position of the center of the frame is moved as a position (px, py) of the camera shake detection in the X-direction and the Y-direction, and the size of the frame is gradually enlarged with reference to the rotation shake around the Z-axis by repeating the image pickup operation. A size of the frame in the X-direction is designated by a symbol "qx", a size of the frame in the Y-direction is designated by a symbol "qy", and the number of the first counter is designated by a symbol "n". The sizes "qx" and "qy" are shown by the following equations.

$qx=1400+(n-1)\cdot 10$ $qy=1000+(n-1)\cdot 10$

In a third method, the position of the center of the frame is moved as a position (px, py) of the camera shake detection in the X-direction and the Y-direction, and the size of the frame is fixed to be larger with reference to the rotation shake around the Z-axis. A size of the frame in the X-direction is designated by a symbol "qx", and a size of the frame in the Y-direction is designated by a symbol "qy". The sizes "qx" and "qy" are shown by the following equations.

$qx=1400+100$ $qy=1000+100$

When the frame from which the pixel data are outputted is set, the main controller 300 controls the image data reader 305 for reading out the image data from the image pickup device 110 (Step #535). Furthermore, the main controller 300 compresses the image data if necessary (Step #540), and memorizes the image data into the corresponding memory region 314a in the image data memory portion 314 (Step #545).

hereupon, an example of the compression of the image data in the step #540 is described. In a first method (differential data compression method) for compressing the image data, a difference of two image data, for example, respectively taken in the first image pickup operation and in the second image pickup operation is obtained, and the first image data and the differential data are memorized. As a result, the capacity of the memory necessary to memorize the first and the second image data can be reduced, in other words, the image data are compressed. The differential data compression method has relatively low compression ratio but has an advantage of a fast processing speed.

In a second method (JPEG compression method) for compressing the image data, each image data is compressed by the JPEG compression. The JPEG compression method has a disadvantage of a slow processing speed but has an advantage of a larger compression ratio. When the capacity of the image data memory portion 314 is smaller, the JPEG compression method is effective.

The method for compressing the image data is not restricted by the above-mentioned examples. Another method such as GIF (Graphic Interchange Format) can be used. Furthermore, it is preferable to prepare plural kinds of compression methods and the most suitable method is to be selected corresponding to the number of image pickup operations "C".

Figure 21:
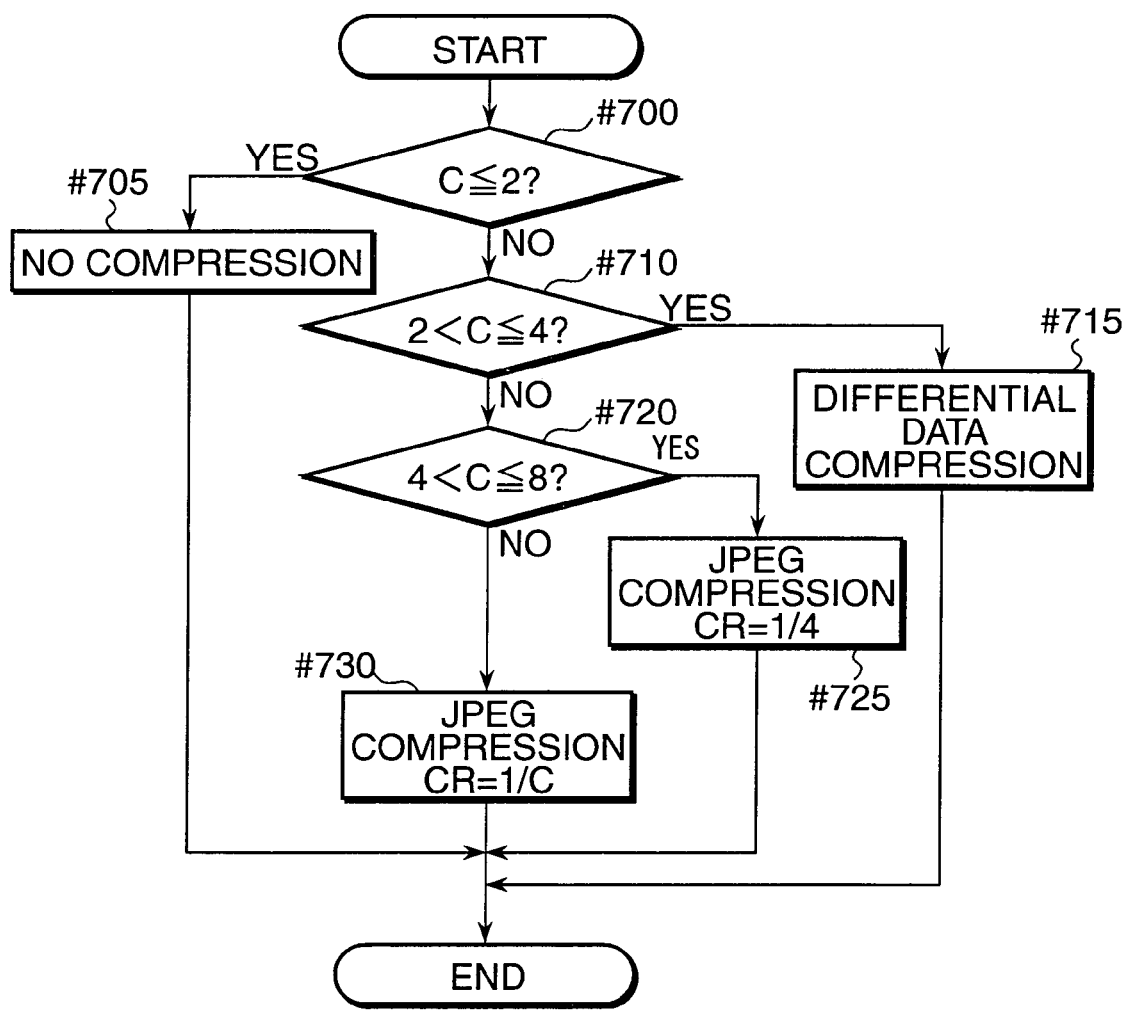
FIG. 21 is a flowchart showing a compression method selecting subroutine in the second embodiment.

Details for selecting the compression method is described with reference to FIG. 21. At first, the main controller 300 judges whether the number of image pickup operations "C" is equal to or smaller than two or not ($C \leq 2$?) (Step #700). When the number of image pickup operation is one or two (YES in Step #700), the capacity of the image data to be recorded is not so large, so that the main controller 300 controls the image data memory portion 314 for memorizing the image data into the memory region 314a without compression (Step #705).

When the number of image pickup operations "C" is larger than two (NO in Step #700), the main controller 300 further judges whether the number of image pickup operations "C" is equal to or smaller than four or not ($2<C\leq 4$?) (Step #710). When the number of image pickup operations "C" is three or four (YES in Step #710), the main controller 300 selects the above-mentioned differential data compression method, and it controls the image data memory portion 314 for memorizing the first image data and each differential data into the memory region 314a (Step #715).

When the number of image pickup operations "C" is larger than five (NO in Step #710), the main controller 300 further judges whether the number of image pickup operations "C" is equal to or smaller than eight or not ($4<C\leq 8$?) (Step #720). When the number of image pickup operations "C" is five to eight (YES in Step #720), the main controller 300 selects the above-mentioned JPEG compression method, and it controls the image data memory portion 314 for compressing each image data by a compression ratio (CR) 1/4 and for memorizing each compressed data into the memory region 314a (Step #725).

When the number of image pickup operations "C" is larger than nine (NO in Step #720), the main controller 300 selects the above-mentioned JPEG compression method, and it controls the image data memory portion 314 for compressing each image data by a compression ratio (CR) 1/C and for memorizing each compressed data into the memory region 314a (Step #730).

Figure 19:
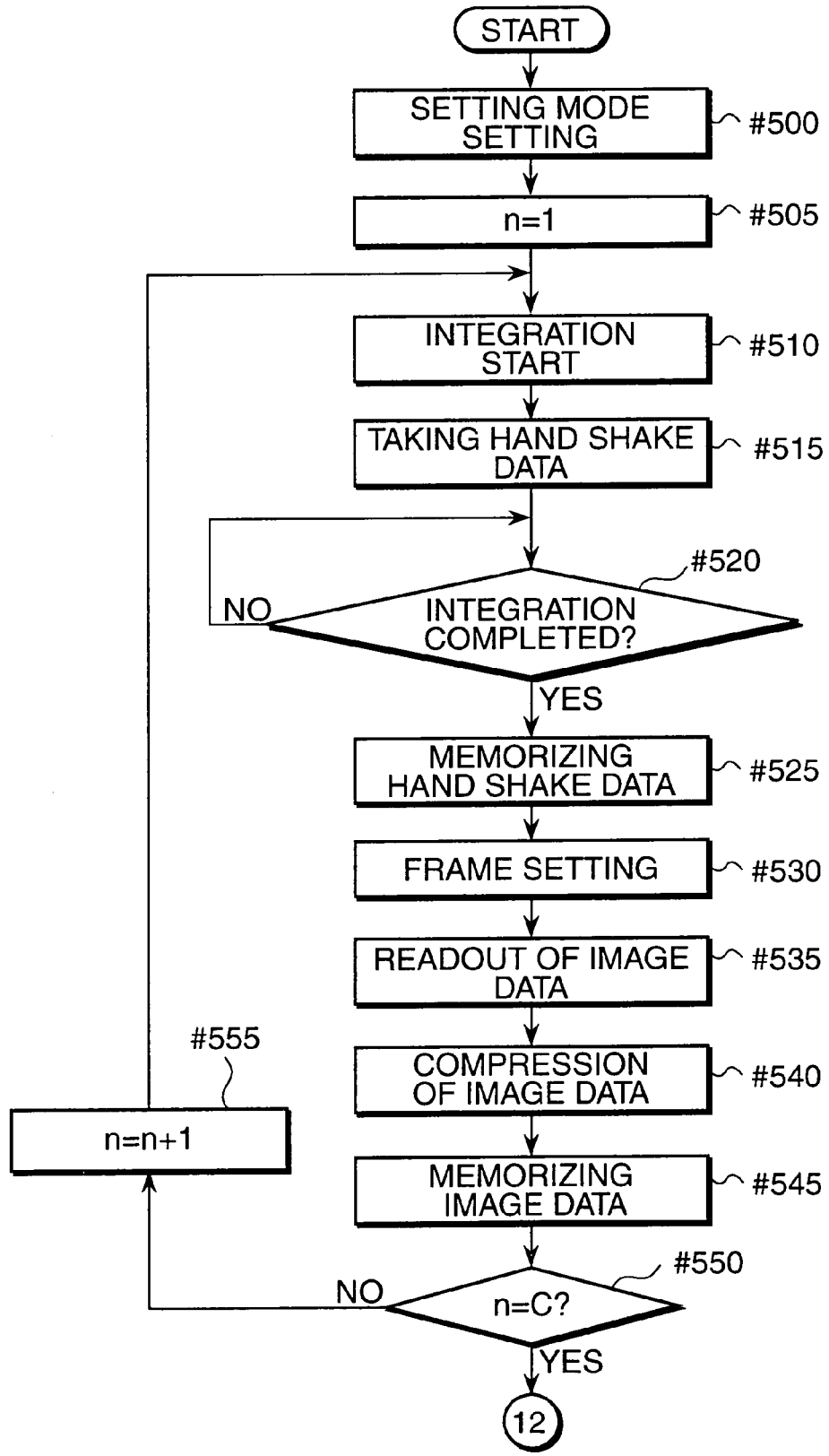
FIG. 19 is a flowchart showing an image pickup subroutine in the step #50 or #75 in the main flow shown in FIGS. 17 and 18.
Figure 20:
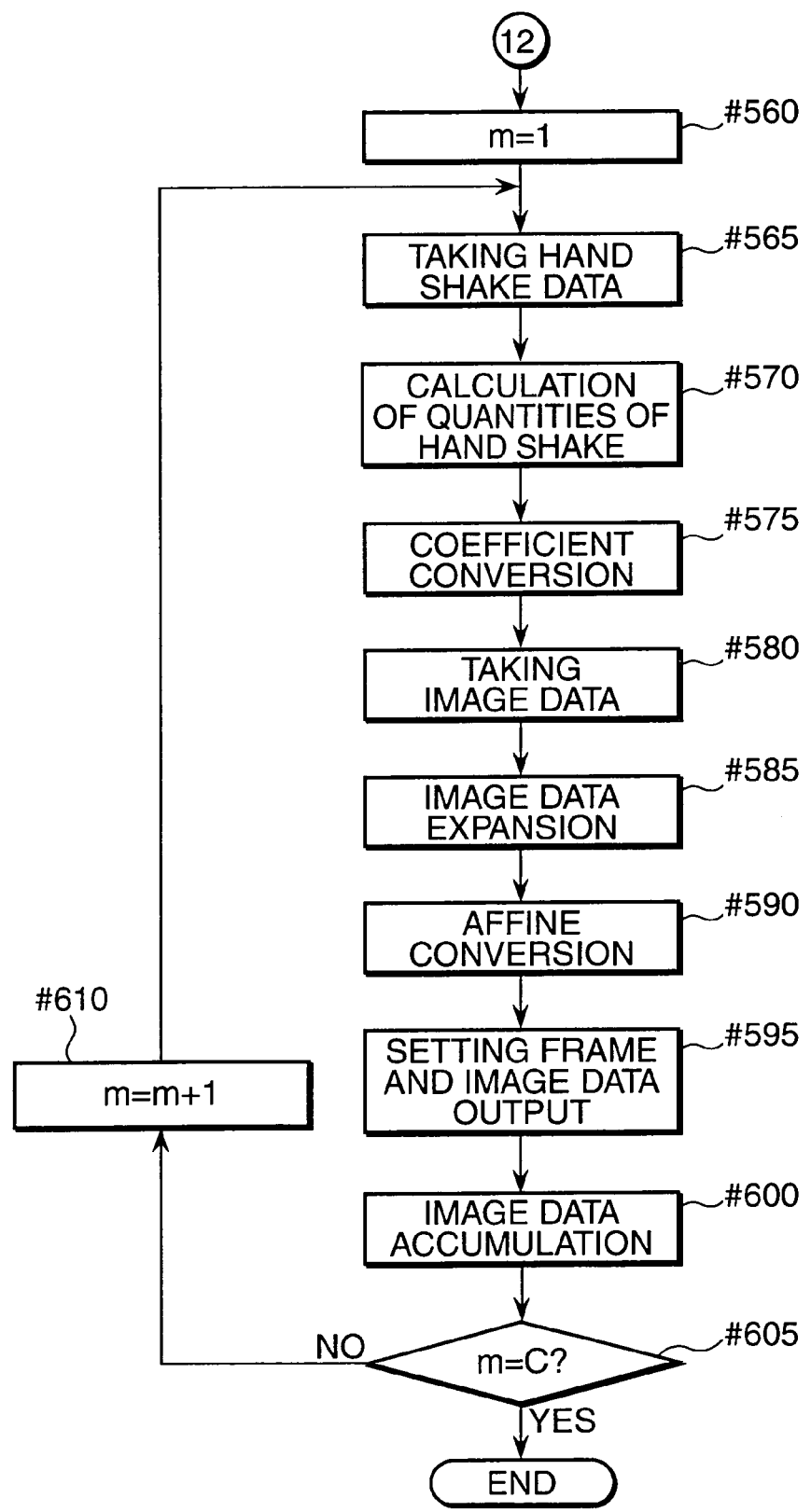
FIG. 20 is a flowchart showing a continuance of the flowchart shown in FIG. 19.

Return to the flow shown in FIGS. 19 and 20, when the image data is memorized in the image data memory portion 314, the main controller 300 judges whether the first counter "n" reaches to the number of image pickup operations "C" or not (Step #550). In this case, the image pickup operation is the first, so that the counter n equals one (n=1). When the image data are taken at least twice (NO in Step #550), the main controller 300 increases the first counter "n" by one (Step #555) and returns to the step #510 for starting the second image pickup operation by the image pickup device 110.

When the first counter "n" reaches to the number of image pickup operations "C" (YES in Step #550), the main controller 300 controls the image data corrector 306 for correcting the image data memorized in the image data memory portion 314 by using the results of the camera shake detection memorized in the camera shake memory portion 313.

When the correction of the image data is started, the main controller 300 resets a second counter "m" (at this time, m=1) (Step #560). The image data controller 306 takes the data "detx(m)", #dety(m)" and "detz(m)" (n>m) from the camera shake memory portion 313 (Step #565), and calculates the quantities of camera shake "Δdetx", "Δdety" and "Δdetz" by the following equations (Step #570).

Δdetx=detx(m)−detx(1)

Δdety=dety(m)−dety(1)

Δdetz=detz(m)−detz(1)

When the quantities of camera shake are calculated, the main controller 300 executes coefficient conversion for converting the quantities of camera shake which are the sensing quantity to quantities for shake correction (Step #575). The coefficient conversion is executed by the following equations.

px=ax·Δdety py=ay·Δdetx degz=az·Δdetz

Hereupon, the symbol "ax" designates a coefficient for calculating an image data reading position in the X-direction from a quantity of rotation shake "Δdety" around the Y-axis. The symbol "ay" designates a coefficient for calculating an image data reading position in the Y-direction from a quantity of rotation shake "Δdetx" around the X-axis. The symbol "az" designates a coefficient for calculating a rotation quantity of the image "degz" around the Z-axis from a quantity of rotation shake "Δdetz" around the Z-axis.

When the coefficient conversion is completed, the image data corrector 306 reads out the image data memorized in the image data memory portion 314 (Step #580). When the image data are compressed, the compressed image data are expanded to be corrected (Step #585).

When the image data are read out, the affine converter 306a in the image data corrector 306 executes the affine conversion by the following equation (Step #590).

$$\begin{pmatrix} Xo \\ Yo \end{pmatrix} = \begin{pmatrix} \cos(-degz) & -\sin(-degz) \\ \sin(-degz) & \cos(-degz) \end{pmatrix} \begin{pmatrix} Xi \\ Yi \end{pmatrix} + \begin{pmatrix} -px \\ -py \end{pmatrix}$$

Hereupon, (Xi, Yi) are the coordinates of the pixel data before the correction, and (Xo, Yo) are the coordinates of the pixel data after the correction. By using the affine conversion, the shifts of the coordinates (−px, −py) in the X-direction and the Y-direction and the rotation (−degz) around the Z-axis shown in FIGS. 11A and 11B can be executed at the same time.

By such the image data correction, the image data taken on and after the second image pickup operation can be corrected the movement of the camera due to the camera shake of the user with respect to the first image data. When the correction of the image data is completed, the image data corrector 306 selects a frame of the image, for example the actual image frame shown in FIG. 3 with respect to the center "P1" of the photosensing plane of the image pickup device 110, which is to be displayed on the monitor display 130 or to be recorded into the recording medium 141. Subsequently, the main controller 300 controls the image data corrector 306 to output the image data corresponding to the frame (Step #595), and controls the image data accumulator 307 to accumulate the image data (Step #600).

When the image data is accumulated into the image data accumulator 307, the main controller judges whether the second counter "m" reaches to the number of image pickup operations "C" or not (Step #605). When the second counter "m" does not reach to the number "C", the main controller 300 increases the second counter "m" by one (Step #610), and repeats the steps #565 to #605 until the second counter "m" reaches to the number "C". When the second counter "m" reaches to the number "C", an image data of proper exposure (having proper quantity of the electric charge in each pixel) is accumulated in the image data accumulator 307. Thus, the main controller 300 completes the image pickup subroutine and proceeds to the monitor image display subroutine in the step #55 or the image data recording subroutine in the step #80.

OTHER MODIFICATION

In the above-mentioned first embodiment, as the method for correcting the image data, the position of the readable image frame (see FIG. 2) is shifted parallel to the X-direction and the Y-direction for correcting the rotation shakes around the X-axis and the Y-axis, and the shifted frame is rotated around the Z-axis for correcting the rotation shake around the Z-axis. It, however, is possible to use the affine conversion for correcting the image data similar to the second embodiment.

On the other hand, in the above-mentioned second embodiment, the affine conversion is used for correcting the image data. It, however, is possible to correct the rotation shakes around the X-axis and the Y-axis by a different method from the method for correcting the rotation shake around the Z-axis, similar to the first embodiment. Furthermore, in the second embodiment, the image data are compressed before being memorized in the image data memory portion 314. It, however, is possible to memorize the image data directly without the compression.

Furthermore, in the above-mentioned first and second embodiments, the image pickup operation after the second switch S2 of the shutter start button 101 is switched on is configured to output the image data directly without adding the pixel data of the image pickup device 110. It, however, is possible to add two pixel data of adjoining pixels when the luminance of the object is lower but it is acceptable to reduce the resolution of the image to be half. In this case, the object is essentially dark and the details of the object is not so sharp, so that it is not so unnatural. Alternatively, there is an advantage that the number of image pickup operation becomes half.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. A camera system comprising:
an image pickup device for taking an image formed by light flux from an object;
a luminance sensor for sensing luminance of the object;

a detector for judging whether a proper exposure time of the image pickup device which is calculated by the luminance of the object is longer than a predetermined time period; and a controller for controlling the image pickup device for taking a plurality of images of the same field of the object by a control exposure time T2 equal to or shorter than the predetermined time period, when the calculated exposure time is longer than the predetermined time period, wherein the control exposure time T2 and the number of image taking operations C are shown by the following equations;

$C=INT(T1/T0)$ and $T2=T1/C$ where the symbol T1 designates the proper exposure time, the symbol T0 designates a limit exposure time causing a camera shake, and the symbol INT signifies raising fractions to form an integer.

2. A camera system comprising:

an image pickup device for taking an image formed by light flux from an object;

a luminance sensor for sensing luminance of the object;

a detector for judging whether a proper exposure time of the image pickup device which is calculated by the luminance of the object is longer than a predetermined time period; and a controller for controlling the image pickup device for taking a plurality of images of the same field of the object by a control exposure time T2 equal to or shorter than the predetermined time period, when the calculated exposure time is longer than the predetermined time period, wherein the control exposure time T2 and the number of image taking operations C are shown by the following equations;

$C=INT(T1/T3)$ and $T2=T1/C$ where the symbol T1 designates the proper exposure time, the symbol T3 designates an optional time shorter than a limit exposure time T0 causing a camera shake, and the symbol INT signifies raising fractions to form an integer.

3. A camera system comprising:

an image pickup device for taking an image formed by light flux from an object;

a luminance sensor for sensing luminance of the object;

a detector for judging whether a proper exposure time of the image pickup device which is calculated from the luminance of the object is longer than a predetermined time period;

a controller for controlling the image pickup device for automatically determining and taking a plurality of images to be subsequently composited of the same field of the object by a control exposure time equal to or shorter than the predetermined time period, when the calculated exposure time is longer than the predetermined time period;

a moving sensor for sensing a quantity of movement of a camera from a position where a first image is taken to a position where the last image is taken when the image is taken more than twice;

a memory for compressing the image data of each of said plurality of images and temporarily storing the compressed image data and data of the quantity of movement corresponding thereto at least until the time when all of the plurality of images have been taken, wherein one method of data compression is selected from among a plurality of compression methods which have mutually different compression speeds, in accordance with the automatically determined number of image taking operations;

an image data corrector that corrects the data of each of said plurality of images read from said memory by responding to the quantity of movement after all the image data is taken; and an image compositor that forms single image data by compositing the corrected image data for each of said plurality of images.

4. A camera system for memorizing image data of a plurality of images to be composited into a single image, in which one image among said plurality of images is designated as a standard image, comprising: a memory region for storing data; and a controller for compressing image data of said plurality of images except said standard image and for temporarily storing the compressed image data and the standard image data into the memory region; and wherein the controller selects a compression ratio and/or a method of data compression for said plurality of images except said standard image, corresponding to a condition when the image data are taken.

5. The camera system in accordance with claim 4, wherein the condition when the image data are taken is at least one of a luminance of an object, a number of image taking operations, a region from which image data are read out and a time period from a standard time to a time of taking an image.

6. A camera system comprising:

an image pickup device for taking an image formed by light flux from an object, and having an effective region larger than an actual frame size of the image;

a luminance sensor for sensing luminance of the object;

a detector for judging whether a proper exposure time of the image pickup device which is calculated by the luminance of the object is longer than a predetermined time period;

a controller for controlling the image pickup device to take a plurality of images of the same field of the object by a control exposure time equal to or shorter than the predetermined time period, when the calculated exposure time is longer than the predetermined time period, an image data corrector that corrects the data of each of said plurality of images for rotation shake around each axis of an orthogonal coordinate system that includes an optical axis of an optical lens system, wherein rotation shake around the two axes perpendicular to the optical axis are corrected by execution of a software process which shifts regions from which image data are read, and rotation shake around the optical axis is corrected by a hardware process that rotates image data around the optical axis; and an image compositor that forms single image data by compositing the corrected image data for each of said plurality of images.

7. A camera system comprising:

an image pickup device for taking an image formed by light flux from an object;

a luminance sensor for sensing luminance of the object;

a detector for judging whether a proper exposure time of the image pickup device which is calculated by the luminance of the object is longer than a predetermined time period;

a controller for controlling the image pickup device to take a plurality of images of the same field of the object by a control exposure time equal to or shorter than the predetermined time period, when the calculated exposure time is longer than the predetermined time period, an image data corrector that corrects the data of each of said plurality of images for rotation shake around each axis of an orthogonal coordinate system that includes an optical axis of an optical lens system, wherein rotation shake around the two axes perpendicular to the optical axis and rotation shake around the optical axis are corrected by affine conversion at the same time; and an image compositor that forms single image data by compositing the corrected image data for each of said plurality of images.

8. A camera system comprising:

an image pickup device for taking an image formed by light flux from an object, and having an effective region larger than an actual frame size of the image;

a luminance sensor for sensing luminance of the object;

a detector for judging whether a proper exposure time of the image pickup device which is calculated by the luminance of the object is longer than a predetermined time period;

a controller for controlling the image pickup device to take a plurality of images of the same field of the object by a control exposure time equal to or shorter than the predetermined time period, when the calculated exposure time is longer than the predetermined time period, an image data corrector that corrects the data of each of said plurality of images for rotation shake around each axis of an orthogonal coordinate system that includes an optical axis of an optical lens system, wherein rotation shake around the two axes perpendicular to the optical axis are corrected by shifting of a region from which image data is read, which is larger than the actual frame size of the image and which is gradually enlarged corresponding to the increase of the number of image taking operations, and wherein rotation shake around the optical axis is corrected by rotating image data around the optical axis; and an image compositor that forms single image data by compositing the corrected image data for each of said plurality of images.

* * * * *